United States Patent
Liu et al.

(10) Patent No.: US 9,368,117 B2
(45) Date of Patent: Jun. 14, 2016

(54) DEVICE AND SYSTEM HAVING SMART DIRECTIONAL CONFERENCING

(71) Applicant: QUALCOMM Incorporated, San Diego, CA (US)

(72) Inventors: Kexi Liu, San Diego, CA (US); Pei Xiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 13/725,938

(22) Filed: Dec. 21, 2012

(65) Prior Publication Data
US 2014/0136203 A1 May 15, 2014

Related U.S. Application Data

(60) Provisional application No. 61/726,441, filed on Nov. 14, 2012, provisional application No. 61/726,451, filed on Nov. 14, 2012, provisional application No. 61/726,456, filed on Nov. 14, 2012, provisional application No. 61/726,461, filed on Nov. 14, 2012.

(51) Int. Cl.
| | |
|---|---|
| *G10L 15/00* | (2013.01) |
| *G10L 17/00* | (2013.01) |
| *H04R 29/00* | (2006.01) |
| *G06F 3/16* | (2006.01) |
| *H04R 3/00* | (2006.01) |
| *H04S 7/00* | (2006.01) |
| *G06F 3/0485* | (2013.01) |

(52) U.S. Cl.
CPC ............... *G10L 17/00* (2013.01); *G06F 3/167* (2013.01); *H04R 3/005* (2013.01); *H04R 29/002* (2013.01); *H04S 7/303* (2013.01); *H04S 7/40* (2013.01); *G06F 3/0485* (2013.01); *G10H 2210/301* (2013.01); *G10H 2220/096* (2013.01); *G10H 2220/355* (2013.01)

(58) Field of Classification Search
CPC ...................... G10L 2021/02168; H04M 9/10
USPC .......................................................... 704/246
See application file for complete search history.

(56) References Cited

U.S. PATENT DOCUMENTS

| 4,731,848 A | 3/1988 | Kendall et al. |
|---|---|---|
| 5,666,136 A | 9/1997 | Fujishita et al. |

(Continued)

FOREIGN PATENT DOCUMENTS

| EP | 2031418 A1 | 3/2009 |
|---|---|---|
| WO | 2008051661 A1 | 5/2008 |

(Continued)

OTHER PUBLICATIONS

International Preliminary Report on Patentability from International Application No. PCT/US2013/064705, mailed Feb. 4, 2015, 7 pp.

(Continued)

*Primary Examiner* — Fariba Sirjani
(74) *Attorney, Agent, or Firm* — Shumaker & Sieffert, P.A.

(57) ABSTRACT

Some implementations provide a method for identifying a speaker. The method determines position and orientation of a second device based on data from a first device that is for capturing the position and orientation of the second device. The second device includes several microphones for capturing sound. The second device has movable position and movable orientation. The method assigns an object as a representation of a known user. The object has a moveable position. The method receives a position of the object. The position of the object corresponds to a position of the known user. The method processes the captured sound to identify a sound originating from the direction of the object. The direction of the object is relative to the position and the orientation of the second device. The method identifies the sound originating from the direction of the object as belonging to the known user.

40 Claims, 28 Drawing Sheets

(56) References Cited

U.S. PATENT DOCUMENTS

| | | | |
|---|---|---|---|
| 5,839,109 A | 11/1998 | Iwamida | |
| 6,545,669 B1* | 4/2003 | Kinawi et al. | 345/173 |
| 6,826,284 B1* | 11/2004 | Benesty | G01S 5/22 348/14.08 |
| 6,850,496 B1* | 2/2005 | Knappe | H04M 3/56 370/260 |
| 7,778,739 B2 | 8/2010 | Preston et al. | |
| 7,843,486 B1* | 11/2010 | Blair | H04M 3/568 348/14.01 |
| 7,920,158 B1 | 4/2011 | Beck et al. | |
| 7,995,732 B2 | 8/2011 | Koch et al. | |
| 8,045,736 B2 | 10/2011 | Shibata et al. | |
| 8,050,917 B2* | 11/2011 | Caspi et al. | 704/238 |
| 8,174,934 B2 | 5/2012 | Li et al. | |
| 8,280,404 B1* | 10/2012 | Roskind | H04W 4/026 455/456.1 |
| 8,627,213 B1* | 1/2014 | Jouppi | G06F 3/011 345/419 |
| 8,676,581 B2* | 3/2014 | Flaks | G10L 17/00 348/143 |
| 8,744,065 B2* | 6/2014 | Edholm | H04M 3/2281 379/202.01 |
| 2002/0089541 A1* | 7/2002 | Orbanes | G06F 8/34 715/764 |
| 2003/0006965 A1* | 1/2003 | Bohn | 345/163 |
| 2003/0217871 A1* | 11/2003 | Chao et al. | 178/18.01 |
| 2004/0013252 A1* | 1/2004 | Craner | H04M 1/247 379/142.01 |
| 2004/0080494 A1* | 4/2004 | Fahlman | 345/163 |
| 2004/0109023 A1* | 6/2004 | Tsuchiya | A63F 13/12 715/758 |
| 2004/0125942 A1* | 7/2004 | Beaucoup | H04M 9/082 379/406.01 |
| 2005/0135583 A1* | 6/2005 | Kardos | H04M 3/56 379/142.01 |
| 2006/0238495 A1* | 10/2006 | Davis | G06F 1/1626 345/156 |
| 2007/0075968 A1* | 4/2007 | Hall | G06F 3/046 345/157 |
| 2007/0127668 A1* | 6/2007 | Ahya | H04M 3/56 379/202.01 |
| 2007/0195012 A1 | 8/2007 | Ichikawa et al. | |
| 2007/0217590 A1* | 9/2007 | Loupia | H04M 1/57 379/202.01 |
| 2008/0019531 A1 | 1/2008 | Kimijima | |
| 2008/0101624 A1 | 5/2008 | Schentrup et al. | |
| 2008/0165992 A1* | 7/2008 | Kondo | H04N 7/0122 381/182 |
| 2008/0189115 A1* | 8/2008 | Mayer-Ullmann | G06F 9/4443 704/275 |
| 2008/0252595 A1* | 10/2008 | Boillot | G06F 3/011 345/156 |
| 2008/0253592 A1 | 10/2008 | Sanders et al. | |
| 2008/0255901 A1* | 10/2008 | Carroll | G06Q 30/0237 705/14.37 |
| 2008/0259731 A1* | 10/2008 | Happonen | G10K 11/34 367/121 |
| 2009/0003659 A1* | 1/2009 | Forstall | G01C 21/20 382/113 |
| 2009/0015594 A1 | 1/2009 | Baba | |
| 2009/0080632 A1* | 3/2009 | Zhang | H04M 3/568 379/202.01 |
| 2009/0199111 A1* | 8/2009 | Emori | G06T 13/00 715/758 |
| 2009/0214052 A1* | 8/2009 | Liu | H04R 27/00 381/92 |
| 2009/0299745 A1* | 12/2009 | Kennewick | G10L 15/32 704/257 |
| 2010/0020951 A1* | 1/2010 | Basart | H04M 15/06 379/142.01 |
| 2010/0073454 A1* | 3/2010 | Lovhaugen | G06F 3/0486 348/14.03 |
| 2010/0157726 A1 | 6/2010 | Ando et al. | |
| 2010/0302401 A1 | 12/2010 | Oku et al. | |
| 2010/0303247 A1* | 12/2010 | Sinivaara | G08B 1/08 381/56 |
| 2010/0323652 A1* | 12/2010 | Visser | H04R 3/005 455/232.1 |
| 2011/0013075 A1 | 1/2011 | Kim et al. | |
| 2011/0025635 A1* | 2/2011 | Lee | G06F 1/3203 345/173 |
| 2011/0025916 A1* | 2/2011 | Kohara | H04S 7/30 348/563 |
| 2011/0055703 A1* | 3/2011 | Lundback | H04R 27/00 715/727 |
| 2011/0058662 A1* | 3/2011 | Yoakum | H04M 3/51 379/202.01 |
| 2011/0069643 A1* | 3/2011 | Yoakum | H04L 65/4015 370/261 |
| 2011/0096941 A1* | 4/2011 | Marzetta | G06F 3/013 381/92 |
| 2011/0109937 A1* | 5/2011 | Fujiki et al. | 358/1.15 |
| 2011/0304632 A1* | 12/2011 | Evertt | G06F 3/011 345/474 |
| 2012/0022924 A1* | 1/2012 | Runnels | G06F 3/011 705/14.4 |
| 2012/0027226 A1* | 2/2012 | Desenberg | H04N 7/15 381/105 |
| 2012/0041579 A1 | 2/2012 | Davis et al. | |
| 2012/0052972 A1* | 3/2012 | Bentley | A63B 24/0006 473/223 |
| 2012/0068964 A1* | 3/2012 | Wright | G06F 3/03545 345/174 |
| 2012/0086631 A1* | 4/2012 | Osman | A63F 13/12 345/156 |
| 2012/0098921 A1* | 4/2012 | Stedman | H04M 3/567 348/14.08 |
| 2012/0124602 A1* | 5/2012 | Tan | G09B 5/06 725/9 |
| 2012/0163610 A1 | 6/2012 | Sakagami | |
| 2012/0176467 A1 | 7/2012 | Kenoyer | |
| 2012/0182429 A1 | 7/2012 | Forutanpour et al. | |
| 2012/0262536 A1 | 10/2012 | Chen et al. | |
| 2012/0293405 A1* | 11/2012 | Iida | H04N 5/64 345/156 |
| 2012/0297400 A1* | 11/2012 | Hill | G06F 17/30855 719/318 |
| 2012/0316869 A1* | 12/2012 | Xiang | H04K 1/02 704/226 |
| 2013/0144629 A1* | 6/2013 | Johnston | G06F 3/167 704/275 |
| 2013/0156220 A1* | 6/2013 | Bar-Zeev | G10L 21/0208 381/92 |
| 2013/0259254 A1 | 10/2013 | Xiang et al. | |
| 2013/0278499 A1* | 10/2013 | Anderson | G06F 3/01 345/156 |
| 2014/0013192 A1* | 1/2014 | McQuiggan | G09B 5/062 715/203 |
| 2014/0133665 A1 | 5/2014 | Xiang et al. | |
| 2014/0136981 A1* | 5/2014 | Xiang | H04R 3/005 715/728 |
| 2014/0198029 A1* | 7/2014 | Dang | G06F 3/017 345/156 |
| 2015/0046157 A1* | 2/2015 | Wolff | G10L 15/22 704/231 |
| 2015/0170210 A1* | 6/2015 | Rhee | G06Q 30/0241 705/14.64 |

FOREIGN PATENT DOCUMENTS

| | | |
|---|---|---|
| WO | 2011076286 A1 | 6/2011 |
| WO | 2011076290 A1 | 6/2011 |

OTHER PUBLICATIONS

International Search Report and Written Opinion from International Application No. PCT/US2013/064705, dated Feb. 6, 2014, 10 pp.
Second Written Opinion from International Application No. PCT/US2013/064705, dated Oct. 22, 2014, 6 pp.

* cited by examiner

Mobile Device

```
John: Thanks for listening to the presentation
Bob (Patent Attorney): What's the invention
conception date?
Mary: I think the first email and simulation
happened on October 15, 2012.
John: Right.
Bob (Patent Attorney): Please record that date.
```
~1900

FIG. 19

```
John: Thanks for listening to the presentation
Bob (Patent Attorney): What's the invention
conception date?
Mary: I think the first email and simulation
happened on October 15, 2012.
John: Right.
Bob (Patent Attorney): Please record that date.
```
~2000

FIG. 20

John: Thanks for listening to the presentation
Bob (Patent Attorney): What's the invention conception date?
Mary: I think the first email and simulation happened on October 15, 2012.
John: Right.
Bob (Patent Attorney): Please record that date.

2100

DEVICE AND SYSTEM HAVING SMART DIRECTIONAL CONFERENCING

CLAIM OF PRIORITY

The present application for patent claims priority to and benefit of U.S. Provisional Patent Application No. 61/726,441, titled "Device and System Having Smart Directional Conferencing", filed Nov. 14, 2012.

The present application for patent also claims priority to and benefit of U.S. Provisional Patent Application No. 61/726,461, titled "Collaborative Document Review and Editing", filed Nov. 14, 2012.

The present application for patent also claims priority to and benefit of U.S. Provisional Application No. 61/726,451, titled "Device and System for Refreshing a Sound Field in a Physical Space" filed Nov. 14, 2012.

The present application for patent also claims priority to and benefit of U.S. Provisional Application No. 61/726,456, titled "Method and Apparatus for Providing Tangible Control of Sound" filed Nov. 14, 2012.

FIELD

Various features relate to a device and a system having smart directional conferencing.

BACKGROUND

A microphone array can spatially differentiate different sound sources, including those from users based on the direction of arrival (DOA) of the audio signals (e.g., voice) from the users. However, this method cannot identify the identity of the sound source. That is, the above method can locate the direction of sound sources, but it cannot identify the exact identity of the sound source. For example, if the sound sources are people speaking, the microphone array can determine that people are speaking, and the number of people speaking. However, who is speaking, or what the name of the person speaking is cannot be determined.

SUMMARY

Various features, apparatus and methods described herein provide a device and a system having smart directional conferencing.

A first example provides an apparatus for identifying a speaker. The apparatus includes a first device for capturing a position and an orientation of a second device. The second device includes several microphones for capturing sound. The second device has a movable position and a movable orientation. The apparatus also includes at least one processor. The at least one processor is configured to determine the position and orientation of the second device based on data from the first device. The at least one processor is configured to assign an object as a representation of a known user. The object has a moveable position. The at least one processor is configured to receive a position of the object. The position of the object corresponds to a position of the known user. The at least one processor is configured to process the captured sound to identify a sound originating from the direction of the object. The direction of the object is relative to the position and the orientation of the second device. The at least one processor is configured to identify a sound originating from the direction of the object as belonging to the known user.

According to one aspect, the first device is a touch sensitive screen. In some implementations, the second device includes a first inductive component and a second inductive component. In some implementations, the touch sensitive screen is capturing the position and the orientation of the second device by capturing where the first and second inductive components are coupled to the touch sensitive screen. In some implementations, the first inductive component has a different size than the second inductive component. In some implementations, the touch sensitive screen is integrated in a surface table. In some implementations, the touch sensitive screen is integrated in a tablet.

According to an aspect, the first device is an image capturing screen. In some implementations, the second device includes at least one visual marker. The image capturing screen for capturing the position and the orientation of the second device by capturing the position and orientation of the at least one visual marker of the second device.

According to another aspect, the object is a graphical user interface element in a graphical user interface presented on a screen. In some implementations, the screen is a touch sensitive screen and the graphical user interface element is moveable within the graphical user interface via an interaction with the touch sensitive screen displaying the graphical user interface.

According to yet another aspect, a movement in the position of the object represents a movement in the position of the known user. In some implementations, the object is a physical object that is moveable. In some implementations, the object is a device having a touch sensitive screen. In some implementations, the object is another microphone array coupled to the system.

According to one aspect, the first device is a mobile device. In some implementations, the mobile device is a handset, a tablet, a phone, a smart phone, a portable electronic device, an electronic notepad, and/or a personal digital assistant (PDA).

A second example provides a method for identifying a speaker. The method determines a position and an orientation of a second device based on data from a first device. The first device is for capturing the position and orientation of the second device. The second device includes several microphones for capturing sound. The second device has a movable position and a movable orientation. The method assigns an object as a representation of a known user. The object has a moveable position. The method receives a position of the object. The position of the object corresponds to a position of the known user. The method processes the captured sound to identify a sound originating from the direction of the object. The direction of the object is relative to the position and the orientation of the second device. The method identifies a sound originating from the direction of the object as belonging to the known user.

According to one aspect, the first device is a touch sensitive screen. In some implementations, the second device includes a first inductive component and a second inductive component. In some implementations, the touch sensitive screen is capturing the position and the orientation of the second device by capturing where the first and second inductive components are coupled to the touch sensitive screen. In some implementations, the first inductive component has a different size than the second inductive component. In some implementations, the touch sensitive screen is integrated in a surface table. In some implementations, the touch sensitive screen is integrated in a tablet.

According to an aspect, the first device is an image capturing screen. In some implementations, the second device includes at least one visual marker. The image capturing screen for capturing the position and the orientation of the second device by capturing the position and orientation of the at least one visual marker of the second device.

According to another aspect, the object is a graphical user interface element in a graphical user interface presented on a screen. In some implementations, the screen is a touch sensitive screen and the graphical user interface element is moveable within the graphical user interface via an interaction with the touch sensitive screen displaying the graphical user interface.

According to yet another aspect, a movement in the position of the object represents a movement in the position of the known user. In some implementations, the object is a physical object that is moveable. In some implementations, the object is a device having a touch sensitive screen. In some implementations, the object is another microphone array coupled to the system.

According to one aspect, the first device is a mobile device. In some implementations, the mobile device is a handset, a tablet, a phone, a smart phone, a portable electronic device, an electronic notepad, and/or a personal digital assistant (PDA).

A third example provides an apparatus for identifying a speaker. The apparatus includes a means for determining position and orientation of a second device based on data from a first device. The first device is for capturing the position and orientation of the second device. The second device includes several microphones for capturing sound. The second device has a movable position and a movable orientation. The apparatus includes a means for assigning an object as a representation of a known user. The object has a moveable position. The apparatus includes a means for receiving a position of the object. The position of the object corresponds to a position of the known user. The apparatus includes a means for processing the captured sound to identify a sound originating from the direction of the object. The direction of the object is relative to the position and the orientation of the second device. The apparatus includes a means for identifying a sound originating from the direction of the object as belonging to the known user.

According to one aspect, the first device is a touch sensitive screen. In some implementations, the second device includes a first inductive component and a second inductive component. In some implementations, the touch sensitive screen is capturing the position and the orientation of the second device by capturing where the first and second inductive components are coupled to the touch sensitive screen. In some implementations, the first inductive component has a different size than the second inductive component. In some implementations, the touch sensitive screen is integrated in a surface table. In some implementations, the touch sensitive screen is integrated in a tablet.

According to an aspect, the first device is an image capturing screen. In some implementations, the second device includes at least one visual marker. The image capturing screen for capturing the position and the orientation of the second device by capturing the position and orientation of the at least one visual marker of the second device.

According to another aspect, the object is a graphical user interface element in a graphical user interface presented on a screen. In some implementations, the screen is a touch sensitive screen and the graphical user interface element is moveable within the graphical user interface via an interaction with the touch sensitive screen displaying the graphical user interface.

According to yet another aspect, a movement in the position of the object represents a movement in the position of the known user. In some implementations, the object is a physical object that is moveable. In some implementations, the object is a device having a touch sensitive screen. In some implementations, the object is another microphone array coupled to the system.

According to one aspect, the first device is a mobile device. In some implementations, the mobile device is a handset, a tablet, a phone, a smart phone, a portable electronic device, an electronic notepad, and/or a personal digital assistant (PDA).

A fourth example provides a computer readable storage medium that includes one or more instructions for identifying a speaker, which when executed by at least one processor, causes the at least one processor to: determine position and orientation of a second device based on data from a first device, the first device for capturing the position and orientation of the second device, the second device includes several microphones for capturing sound, wherein the second device has a movable position and a movable orientation; assign an object as a representation of a known user, the object having a moveable position; receive a position of the object, the position of the object corresponding to a position of the known user; process the captured sound to identify a sound originating from the direction of the object, wherein the direction of the object is relative to the position and the orientation of the second device; and identify a sound originating from the direction of the object as belonging to the known user.

According to one aspect, the first device is a touch sensitive screen. In some implementations, the second device includes a first inductive component and a second inductive component. In some implementations, the touch sensitive screen is capturing the position and the orientation of the second device by capturing where the first and second inductive components are coupled to the touch sensitive screen. In some implementations, the first inductive component has a different size than the second inductive component. In some implementations, the touch sensitive screen is integrated in a surface table. In some implementations, the touch sensitive screen is integrated in a tablet.

According to an aspect, the first device is an image capturing screen. In some implementations, the second device includes at least one visual marker. The image capturing screen for capturing the position and the orientation of the second device by capturing the position and orientation of the at least one visual marker of the second device.

According to another aspect, the object is a graphical user interface element in a graphical user interface presented on a screen. In some implementations, the screen is a touch sensitive screen and the graphical user interface element is moveable within the graphical user interface via an interaction with the touch sensitive screen displaying the graphical user interface.

According to yet another aspect, a movement in the position of the object represents a movement in the position of the known user. In some implementations, the object is a physical object that is moveable. In some implementations, the object is a device having a touch sensitive screen. In some implementations, the object is another microphone array coupled to the system.

According to one aspect, the first device is a mobile device. In some implementations, the mobile device is a handset, a tablet, a phone, a smart phone, a portable electronic device, an electronic notepad, and/or a personal digital assistant (PDA).

A fifth example provides a method for collaborating on a shared document. The method generates an identification tag for the shared document. The identification tag is associated with a particular user. The identification tag is generated based on a position of an object relative to a sound capturing device. The object represents the particular user. The method presents the shared document to several users. The shared document includes text associated with the identification tag for the particular user. The text is based on sound from the particular user. The sound is captured by the sound capturing device. The method receives a set of inputs from a set of users, to modify the shared document. Each input from the set of users is from a single input device. The method modifies the shared document based on the received set of inputs from the set of users. The method presents the modified shared document to at least one user.

According to one aspect, the input device is a touch sensitive screen that presents the shared document to the several users. In some implementations, the set of inputs includes a set of gestures on the touch sensitive screen. In some implementations, the modified shared document is presented on the touch sensitive screen.

According to an aspect, the presented modified shared document includes a first indicator identifying a first portion of the modified shared document that was modified by a first user from the set of users.

A sixth example provides an apparatus for collaborating on a shared document. The apparatus includes a means for generating an identification tag for the shared document. The identification tag is associated with a particular user. The identification tag is generated based on a position of an object relative to a sound capturing device. The object represents the particular user. The apparatus includes a means for presenting the shared document to several users. The shared document includes text associated with the identification tag for the particular user. The text is based on sound from the particular user. The sound is captured by the sound capturing device. The apparatus includes a means for receiving a set of inputs from a set of users, to modify the shared document. Each input from the set of users is from a single input device. The apparatus includes a means for modifying the shared document based on the received set of inputs from the set of users. The apparatus includes a means for presenting the modified shared document to at least one user.

According to one aspect, the input device is a touch sensitive screen that presents the shared document to the several users. In some implementations, the set of inputs includes a set of gestures on the touch sensitive screen. In some implementations, the modified shared document is presented on the touch sensitive screen.

According to an aspect, the presented modified shared document includes a first indicator identifying a first portion of the modified shared document that was modified by a first user from the set of users.

A seventh example provides a computer readable storage medium that includes one or more instructions for collaborating on a shared document, which when executed by at least one processor, causes the at least one processor to: generate an identification tag for the shared document, the identification tag associated with a particular user, the identification tag generated based on a position of an object relative to a sound capturing device, the object representing the particular user; present the shared document to several users, the shared document includes text associated with the identification tag for the particular user, the text based on sound from the particular user, the sound captured by the sound capturing device; receive a set of inputs from a set of users, to modify the shared document, wherein each input from the set of users is from a single input device; modify the shared document based on the received set of inputs from the set of users; and present the modified shared document to at least one user.

According to one aspect, the input device is a touch sensitive screen that presents the shared document to the several users. In some implementations, the set of inputs includes a set of gestures on the touch sensitive screen. In some implementations, the modified shared document is presented on the touch sensitive screen.

According to an aspect, the presented modified shared document includes a first indicator identifying a first portion of the modified shared document that was modified by a first user from the set of users.

An eighth example provides a device for collaborating on a shared document. The device includes a screen for displaying a graphical user interface. The device also includes at least one processor coupled to the screen. The at least one processor is configured to generate an identification tag for the shared document. The identification tag is associated with a particular user. The identification tag is generated based on a position of an object relative to a sound capturing device. The object represents the particular user. The at least one processor is further configured to present the shared document to several users. The shared document includes text associated with the identification tag for the particular user. The text is based on sound from the particular user. The sound is captured by the sound capturing device. The at least one processor is further configured to receive a set of inputs from a set of users, to modify the shared document. Each input from the set of users is from a single input device. The at least one processor is further configured to modify the shared document based on the received set of inputs from the set of users. The at least one processor is further configured to present the modified shared document to at least one user.

According to one aspect, the input device is a touch sensitive screen that presents the shared document to the several users. In some implementations, the set of inputs includes a set of gestures on the touch sensitive screen. In some implementations, the modified shared document is presented on the touch sensitive screen.

According to an aspect, the presented modified shared document includes a first indicator identifying a first portion of the modified shared document that was modified by a first user from the set of users.

DRAWINGS

Various features, nature and advantages may become apparent from the detailed description set forth below when taken in conjunction with the drawings in which like reference characters identify correspondingly throughout.

FIG. 19 illustrates a close-up of a transcribed text being provided to a particular user.

FIG. 20 illustrates a close-up of a transcribed text that includes a portion of the text being highlighted.

DETAILED DESCRIPTION

Figure 1:
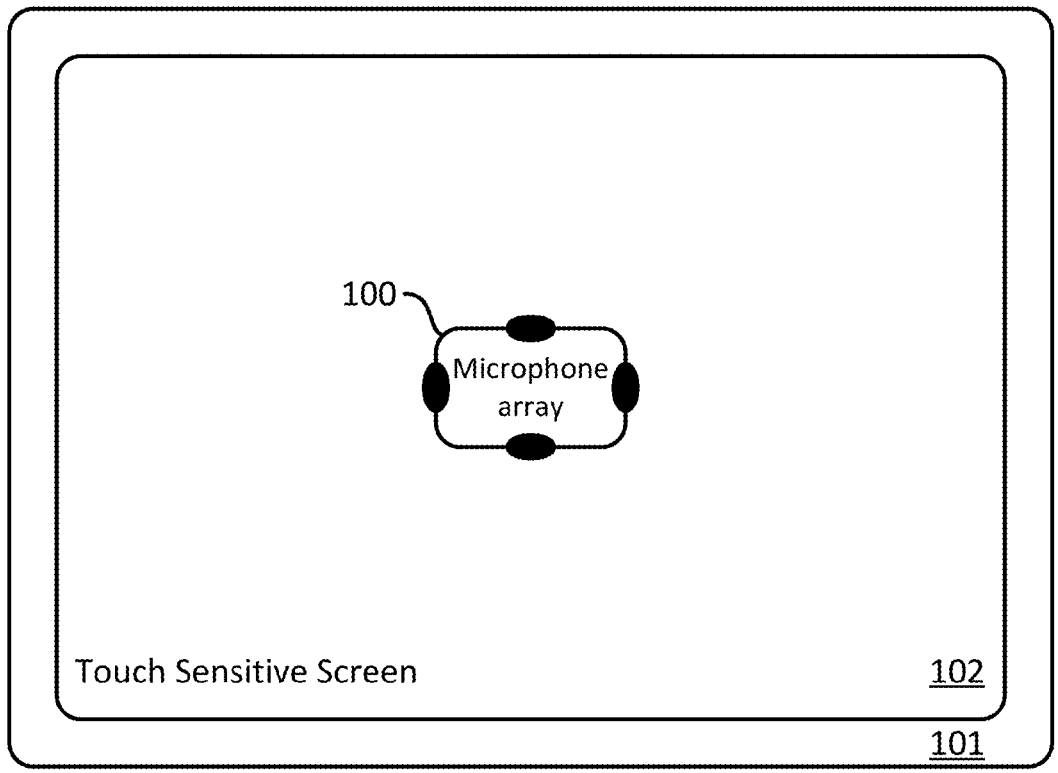
FIG. 1 illustrates a system that includes a microphone array and a device having a touch sensitive screen.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Overview

Some exemplary embodiments of this disclosure pertain to a method for identifying a speaker. The method determines a position and an orientation of a second device based on data from a first device. The first device is for capturing the position and orientation of the second device. The second device includes several microphones for capturing sound. The second device has a movable position and a movable orientation. The method assigns an object as a representation of a known user. The object has a moveable position. The method receives a position of the object. The position of the object corresponds to a position of the known user. The method processes the captured sound to identify a sound originating from the direction of the object. The direction of the object is relative to the position and the orientation of the second device. The method identifies a sound originating from the direction of the object as belonging to the known user.

In some implementations, the second device includes a first inductive component (e.g., first inductor) and a second inductive component (e.g., second inductor). The first and second inductive component may be positioned at the base of the second device (e.g., bottom of a microphone array). In some implementations, the touch sensitive screen captures the position and the orientation of the second device by capturing where the first and second inductive components are coupled to the touch sensitive screen.

Some exemplary embodiments of this disclosure pertain to a method for collaborating on a shared document. The method generates an identification tag for the shared document. The identification tag is associated with a particular user. The identification tag is generated based on a position of an object relative to a sound capturing device. The object represents the particular user. The method presents the shared document to several users. The shared document includes text associated with the identification tag for the particular user. The text is based on sound from the particular user. The sound is captured by the sound capturing device. The method receives a set of inputs from a set of users, to modify the shared document. Each input from the set of users is from a single input device. The method modifies the shared document based on the received set of inputs from the set of users. The method presents the modified shared document to at least one user.

In some implementations, the input device is a touch sensitive screen that presents the shared document to the several users. In some implementations, the set of inputs includes a set of gestures on the touch sensitive screen. In some implementations, the modified shared document is presented on the touch sensitive screen.

In some implementations, the presented modified shared document includes a first indicator identifying a first portion of the modified shared document that was modified by a first user from the set of users.

Some exemplary embodiments of this disclosure pertain to an apparatus for collaborating on a shared document. The apparatus includes a means for generating an identification tag for the shared document. The identification tag is associated with a particular user. The identification tag is generated based on a position of an object relative to a sound capturing device. The object represents the particular user. The apparatus includes a means for presenting the shared document to several users. The shared document includes text associated with the identification tag for the particular user. The text is based on sound from the particular user. The sound is captured by the sound capturing device. The apparatus includes a means for receiving a set of inputs from a set of users, to modify the shared document. Each input from the set of users is from a single input device. The apparatus includes a means for modifying the shared document based on the received set of inputs from the set of users. The apparatus includes a means for presenting the modified shared document to at least one user.

In some implementations, the input device is a touch sensitive screen that presents the shared document to the several users. In some implementations, the set of inputs includes a set of gestures on the touch sensitive screen. In some implementations, the modified shared document is presented on the touch sensitive screen.

In some implementations, the presented modified shared document includes a first indicator identifying a first portion of the modified shared document that was modified by a first user from the set of users.

Some exemplary embodiments of this disclosure pertain to a computer readable storage medium that includes one or more instructions for collaborating on a shared document, which when executed by at least one processor, causes the at least one processor to generate an identification tag for the shared document. The identification tag is associated with a particular user. The identification tag is generated based on a position of an object relative to a sound capturing device. The object represents the particular user. The one or more instructions, which when executed by at least one processor, further causes the at least one processor to present the shared document to several of users. The shared document includes text associated with the identification tag for the particular user. The text is based on sound from the particular user. The sound captured by the sound capturing device. The one or more instructions, which when executed by at least one processor, further causes the at least one processor to receive a set of inputs from a set of users, to modify the shared document. Each input from the set of users is from a single input device. The one or more instructions, which when executed by at least one processor, further causes the at least one processor to modify the shared document based on the received set of inputs from the set of users. The one or more instructions, which when executed by at least one processor, further causes the at least one processor to present the modified shared document to at least one user.

In some implementations, the input device is a touch sensitive screen that presents the shared document to the several users. In some implementations, the set of inputs includes a set of gestures on the touch sensitive screen. In some implementations, the modified shared document is presented on the touch sensitive screen.

In some implementations, the presented modified shared document includes a first indicator identifying a first portion of the modified shared document that was modified by a first user from the set of users.

Some exemplary embodiments of this disclosure pertain to a device for collaborating on a shared document. The device includes a screen for displaying a graphical user interface. The device also includes at least one processor coupled to the screen. The at least one processor is configured to generate an identification tag for the shared document. The identification tag is associated with a particular user. The identification tag is generated based on a position of an object relative to a sound capturing device. The object represents the particular user. The at least one processor is further configured to present the shared document to several users. The shared document includes text associated with the identification tag for the particular user. The text is based on sound from the particular user. The sound is captured by the sound capturing device. The at least one processor is further configured to receive a set of inputs from a set of users, to modify the shared document. Each input from the set of users is from a single input device. The at least one processor is further configured to modify the shared document based on the received set of inputs from the set of users. The at least one processor is further configured to present the modified shared document to at least one user.

In some implementations, the input device is a touch sensitive screen that presents the shared document to the several users. In some implementations, the set of inputs includes a set of gestures on the touch sensitive screen. In some implementations, the modified shared document is presented on the touch sensitive screen.

In some implementations, the presented modified shared document includes a first indicator identifying a first portion of the modified shared document that was modified by a first user from the set of users.

FIG. 1 illustrates an example of a system that enables accurate documentation of a meeting in some embodiments. As shown in FIG. 1, the system includes a microphone array 100 and a device 101.

In some implementations, the microphone array 100 may include at least one processor, a memory, several microphones, at least one transceiver, several inductive elements, a compass, at least one communication interface, and at least one identification marker. The microphones of the microphone array 100 may be arranged in a manner to capture audio from different directions. For example, the microphones may be arranged linearly, in a circle or other arrangements. The microphone array 100 may communicate with the device 101 by using a communication interface and at least one transceiver. In some implementations, the transceiver provides a wireless communication link (for receiving and transmitting data) between the microphone array 100 and the device 101. Different implementations may use different communication protocols to communicate between the microphone array 100 and the device 101. Examples of communication protocols include near-field communication (NFC), Wi-Fi, Bluetooth, ZigBee, Digital Living Network Alliance (DLNA), and Airplay.

In some implementations, the compass provides a way for the microphone array 100 to determine orientation information identifying an orientation of microphone array 100 relative to true north. The orientation information may be used internally or may be passed on to other devices (e.g., device 101) in order to determine the position and/or orientation of the microphone array in some implementations. The inductive elements may also be used to determine the position and/or orientation of microphone array 100. For example, the inductive elements may be used by a device (e.g., device 101) to determine the position and orientation of microphone array 100 on a touch sensitive screen. The identification marker may also be used to determine the position and/or orientation of microphone array 100. In some implementations, identification markers are visual markers that uniquely identify an object. Examples of identification markers include Quick Response (QR) codes, and pair of dots (e.g., green/red dots).

The above description is an overview of possible components/elements of a microphone array. A more detailed description of components/elements of a microphone array will be further described below with reference to FIG. 25.

As shown in FIG. 1, the device 101 includes a touch sensitive screen 102. The touch sensitive screen 102 is for displaying a graphical user interface to a user. The graphical user interface may include graphical user interface elements, such as images, texts, icons, windows, videos, etc. . . . . The touch sensitive screen 102 is also for sensing and capturing user movements (e.g., movement of finger on the touch screen), which can be translated into actions in the graphical user interface. In some implementations, the device 101 and the touch sensitive screen 102 is integrated in a surface table.

In addition to the touch sensitive screen 102, the device 101 may also include at least one processor, a memory, at least on transceiver, at least one communication interface, an image capturing device (e.g., camera, image capturing screen). In some implementations, the above components allow the device 101 to communicate with the microphone array 100, local and remote computers, wireless devices (e.g., phones), portable computer devices (e.g., tablets). The components/elements of the device 101 will be further described below with reference to FIG. 26.

Having provided an overview of the various devices and components of a system for capturing and documenting sound, a detailed description of how these example devices are used in such an example system is described below.

Figure 2:
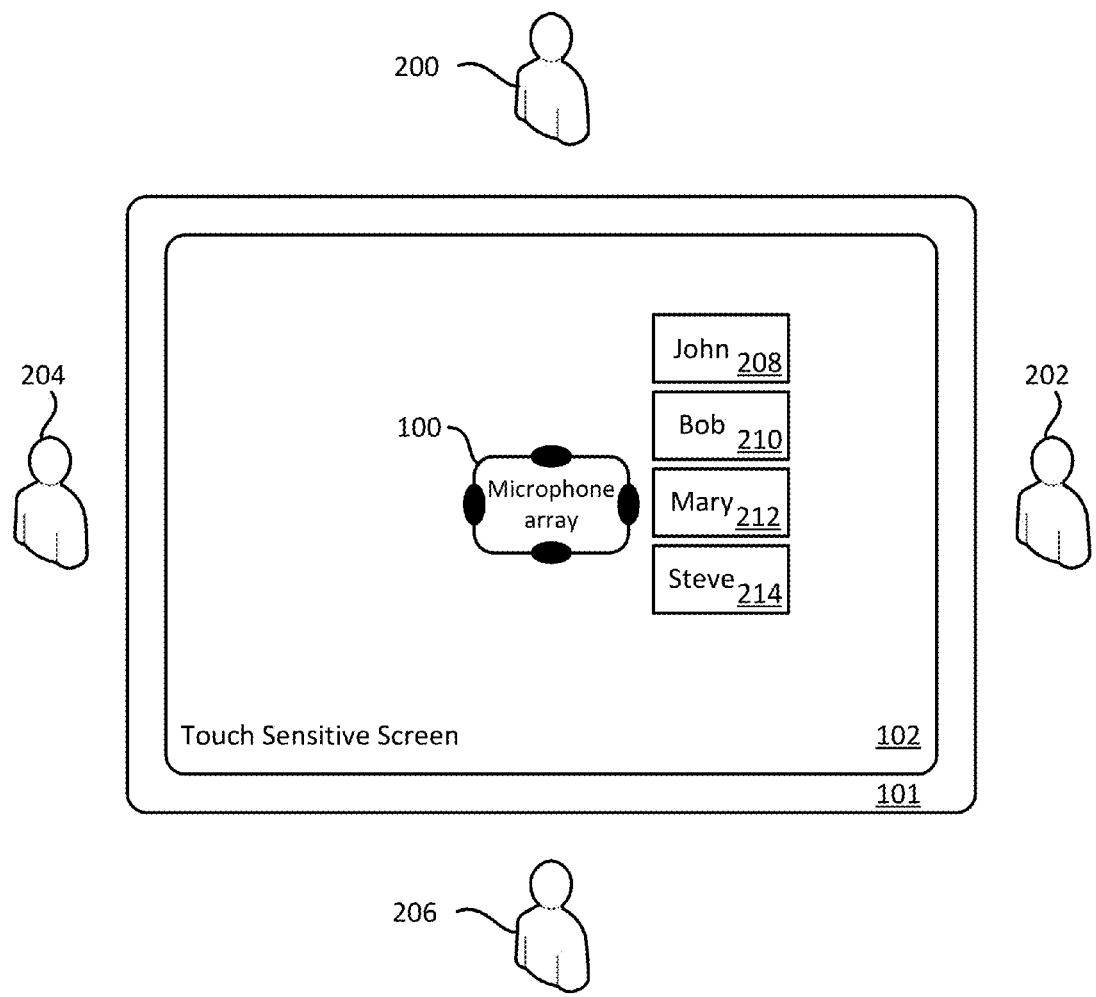
FIG. 2 illustrates a touch sensitive screen displaying a graphical user interface with graphical user interface elements for users.

FIG. 2 illustrates a device 101 that includes a touch sensitive screen 102. A microphone array 100 is positioned on top of the touch sensitive screen 102. FIG. 2 also illustrates four people/users 200-206 participating in a meeting/conference around the device 101. In some implementations, the device 101 is integrated in a surface table. FIG. 2 further illustrates four (4) graphical user interface elements 208-214 that are displayed on the touch sensitive screen 102. These four graphical user interface elements 208-214 represent the four users that may be participating in the meeting/conference. Although, the graphical user interface elements 208-214 are shown as rectangles, the graphical user interface elements 208-214 can be other shapes or other images. For example, the graphical user interface elements 208-214 may be images of the users in some implementations. The graphical user interface elements 208-214 may also be a combination of images and text (e.g., names, bio).

Figure 3:
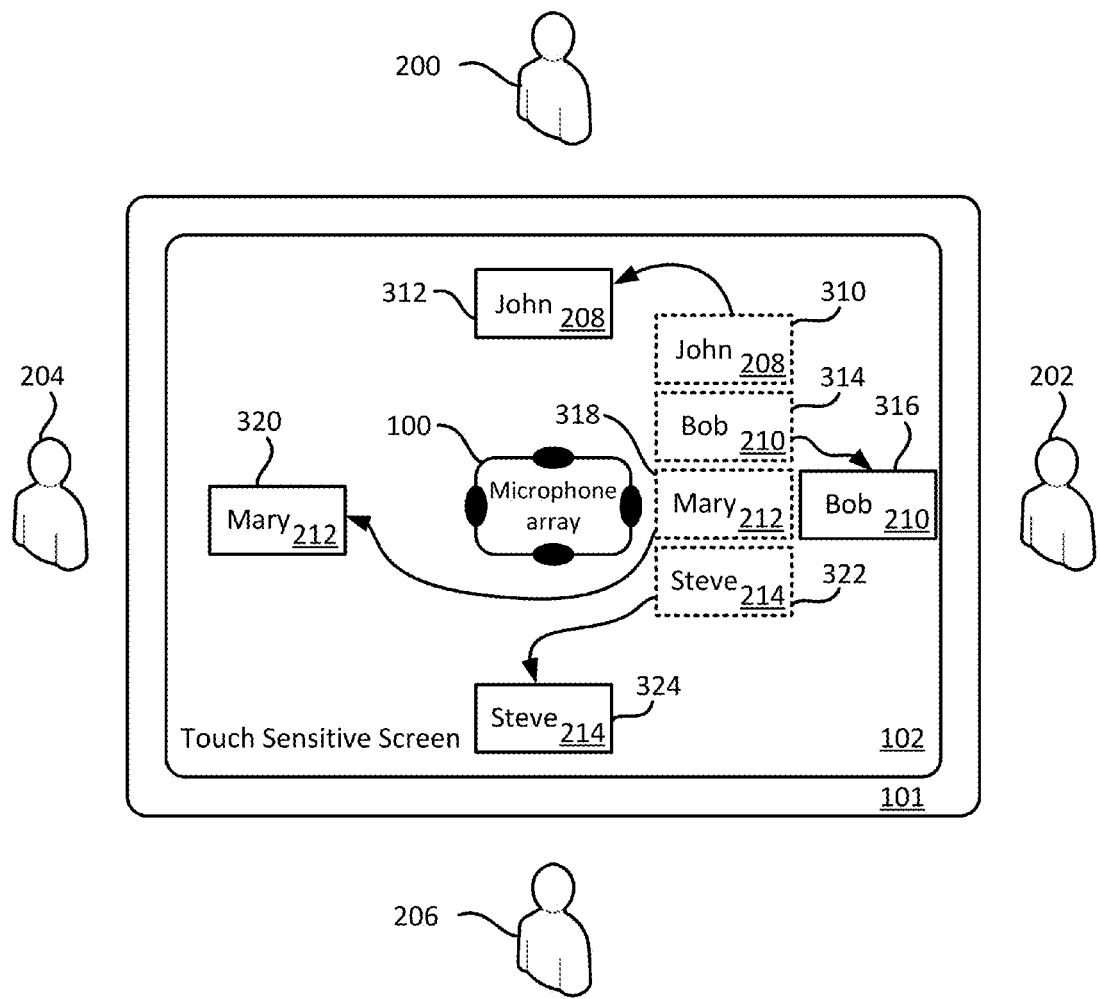
FIG. 3 illustrates graphical user interface elements being move to different positions on the graphical user interface of the touch sensitive screen.

FIG. 3 illustrates a configuration of the touch sensitive screen 102 after users have interacted with the touch sensitive screen 102. As shown in FIG. 3, users 200-206 are positioned about (e.g. around) the touch sensitive screen 102 and each user has selected a graphical user interface element. Specifically, user 200 has selected graphical user interface element 208 and has moved the graphical user interface element 208 from a first position 310 to a second position 312 on the touch sensitive screen 102. Similarly, the user 202 has selected graphical user interface element 210 and has moved the graphical user interface element 210 from a first position 314 to a second position 316 on the touch sensitive screen 102. The user 204 has selected the graphical user interface element 212 and has moved the graphical user interface element 212 from a first position 318 to a second position 320 on the touch sensitive screen 102. Finally, the user 206 has selected the graphical user interface element 214 and has moved the graphical user interface element 214 from a first position 322 to a second position 324 on the touch sensitive screen 102.

In some implementations, users may select and move the graphical user interface elements through a mouse interaction and/or by touching the appropriate graphical user interface element on the touch sensitive screen 102 and dragging it to a desired position.

In some implementations, the final positions of the graphical user interface elements 208-214 represent the general or specific position of the users 200-206 that each graphical user interface element represents. Using the positions of the graphical user interface elements 208-214 relative to the position of the microphone array 100, the system (e.g., microphone array 100) is able to not only determine the direction of the audio but the identity of the speaker. Instead of being some unknown speaker, the system will be able to identify the identity (e.g., name, user) of the speaker and properly document what is being said during the meeting.

In some implementations, none of the graphical user interface elements 208-214 may be displayed when a user arrive at the device. Instead, one or more graphical user interface element may be presented on the touch sensitive screen 102 when one or more user touches a portion of the touch sensitive screen. More specifically, in some implementations, one or more of the users 200-206 may indicate his/her presence to the system (e.g., microphone array 100, device 101) by touching a portion of the touch sensitive screen 102. The particular portion of the touch sensitive screen 102 that is touched by a particular user (e.g., user 200) may represent the general area or vicinity of that particular user (e.g., user 200). Once the touch sensitive screen 102 is touched, the particular user may be presented with either a log in screen (e.g., to enter name or ID) or at least one pre-determined graphical user interface element (e.g., graphical user interface element 214). After login and/or selecting one of the graphical user interface element, a particular graphical user interface element representing the particular user may be displayed on a portion of the touch sensitive screen 102. The position of the particular graphical user interface element may represent the position/angle of the particular user relative to the microphone array 100 in some implementations.

Figure 4:
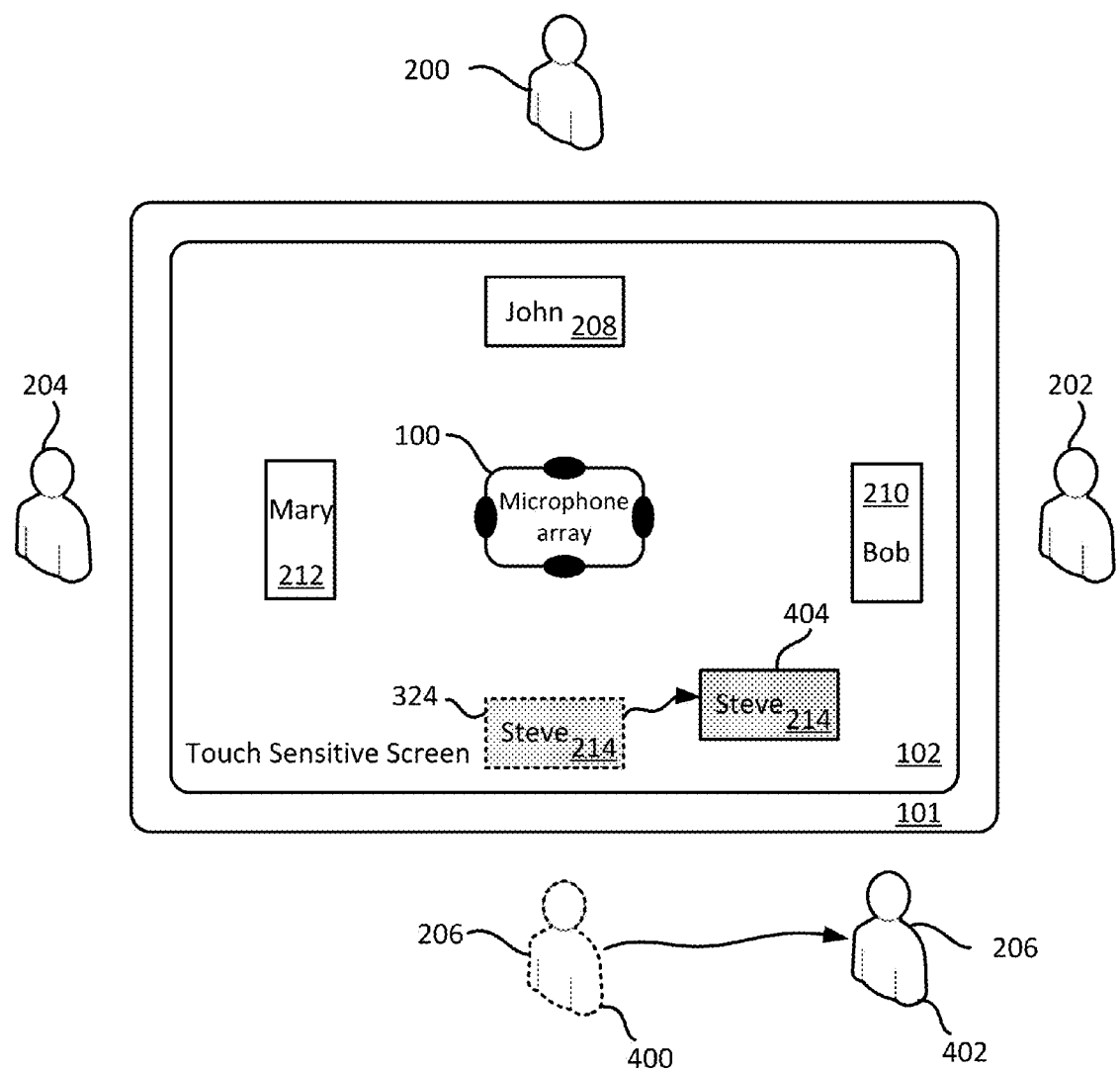
FIG. 4 illustrates a graphical user interface element being move to a different position on the graphical user interface of the touch sensitive screen when a user moves.

During the meeting, one of the users may move. In one example, when that happens, the user may also move the graphical user interface element that represents that user. FIG. 4 illustrates such a scenario. As shown in FIG. 4, the user 206 has moved from position 400 to position 402. In the process, the user 206 also moves the graphical user interface element 214 from position 324 to position 404 on the touch sensitive screen 102. By moving the graphical user interface element 214 to the proper location, the system (e.g., device 101 or microphone array 100) is able to properly capture and identify the user.

In some implementation, the position of the graphical user interface element 214 may be automatically moved by the system (e.g., device 101) when the user 206 move to a different position. Such automatic movement may happen when the user 206 changes position by at least a minimum angle relative to the microphone array 100 in some implementations. In such an instance, the user would not have to manually move the graphical user interface element that represents the user. For example, if the user 206 where to move, the system (e.g., microphone array, device 101) may detect that the sound is coming from a slightly different angle/position than before. The system may determine the new position/angle and automatically adjust the position of the appropriate graphical user interface element in some implementations.

In view of the above, FIG. 4 may also represent the automatic movement of the graphical user interface element 214 from position 324 to position 404 on the touch sensitive screen 102 in response to the user 206 moving from position 400 to position 402 in some implementations.

Figure 5:
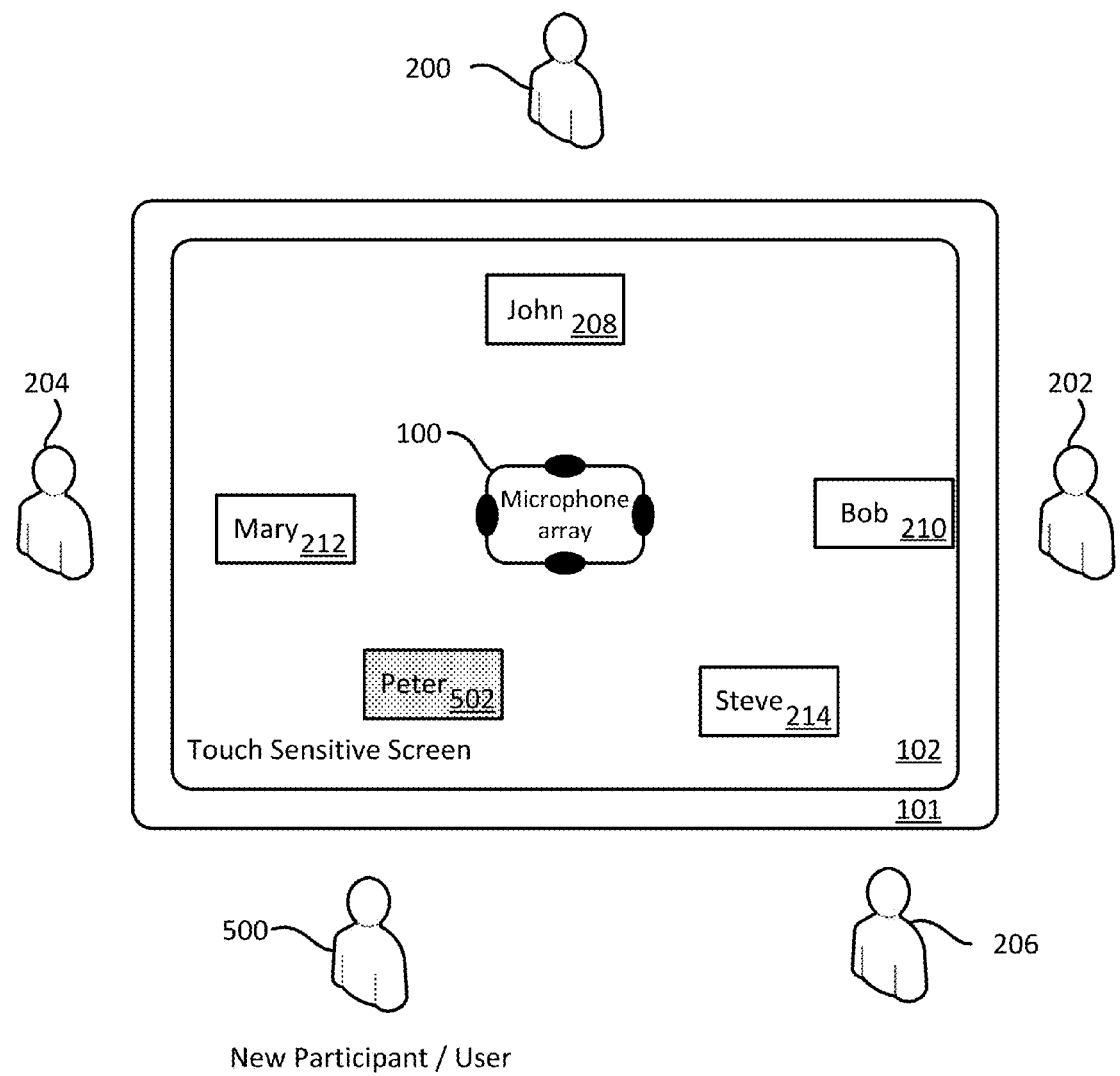
FIG. 5 illustrates a new graphical user interface element being presented on the graphical user interface of the touch sensitive screen.

Another possible scenario that may occur during a meeting is that a new person/user may join the meeting. FIG. 5 illustrates such an instance. As shown in FIG. 5, user 500 has joined the meeting and is located between user 204 and user 206. In some implementations, the user 500 may indicate his/her presence to the system (e.g., microphone array 100, device 101) by touching a portion of the touch sensitive screen 102. The portion of the touch sensitive screen 102 may represent the general area or vicinity of the user 500. Once the touch sensitive screen 102 is touched, the user 500 may be presented with either a log in screen (e.g., to enter name or ID) or pre-determined graphical user interface element. After login and/or selecting one of the graphical user interface element, a graphical user interface element 502 representing the user 500 may be displayed on a portion of the touch sensitive screen 102. The position of the graphical user interface element 502 may represent the position/angle of the user 500 relative to the microphone array 100 in some implementations.

The position of the microphone array 100 is known and/or can be determined through various methods. In some implementations, the touch sensitive screen 102 senses the microphone array 100 because the microphone array 100 is positioned directly on the touch sensitive screen 102 thereby applying a pressure on the touch sensitive screen 102. In addition, the microphone array 100 may include inductive elements, which may allow the system to determine the position and/or orientation of the microphone array 100 on the touch sensitive screen 102 without a user having to manually calibrate the orientation of the microphone array. In such an instance, the position of the inductive elements may provide a basis for the position of the microphone array. In some implementation, the position and/or orientation of the microphone array may be determined by an image capturing screen (e.g., touch sensitive screen 102 that has image capturing capability).

In some implementations, the microphone array 100 is in wireless communication (e.g., using ZigBee) with the device 101 and the device 101 uses various techniques (e.g., triangulation) to determine the location of the microphone array 100 on the touch sensitive screen 102 of the device 101. In some implementations, ultrasonic/infrared/sonic pulses are used to determine the position of the microphone array 100. In other implementations, the microphone array 100 may include an NFC tag, which allows the device 101 to determine the position of the microphone array 100.

In yet some implementations, the microphone array 100 may include an identification marker (e.g., QR code, various dots/shapes), which may be used by an image capturing device (e.g., camera, image capturing screen) to identify the position and location of the microphone array 100. The image capturing device may be in communication with the device 101 in some implementations. In some implementations, a compass may be used to determine the orientation of the microphone array. Different implementations may one or a combination of the above components/elements to determine the position and/or orientation of the microphone array 100. Various methods and approaches for determining the position and/or orientation of a microphone array will be further described below with reference to FIGS. 13-17.

Having described the various components of a system for capturing and documenting sound/voice, a flow diagram of how such a method may be implemented will now be described.

An overview of a method for capturing sound and identifying the identity of speakers will first be described below. One or more devices described in this disclosure may perform this method. After describing the overview method, a more detailed method for capturing sound and identifying the identity of speakers will then be described.

Figure 6:
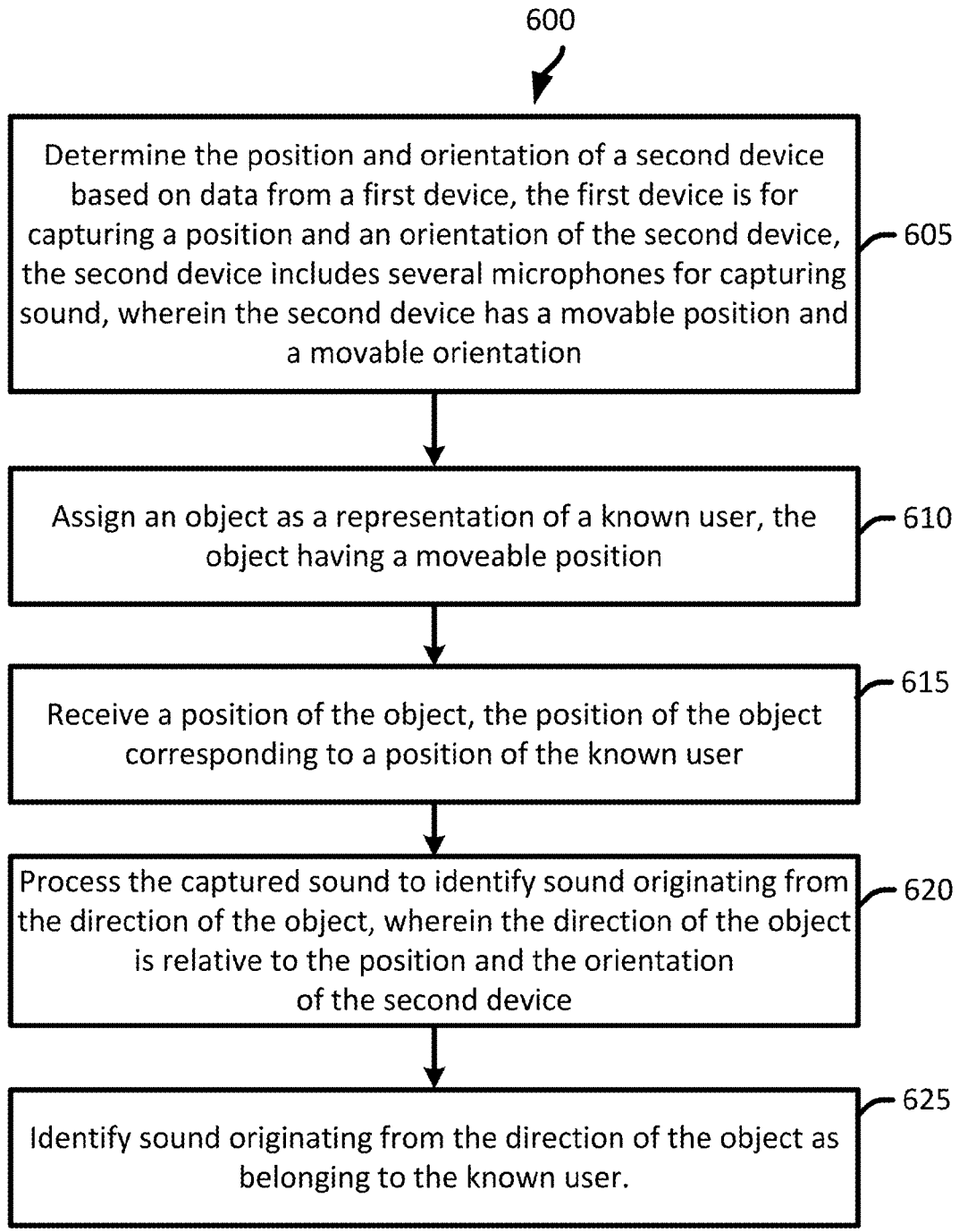
FIG. 6 illustrates a flow diagram of an overview method for capturing voices and identifying the speakers.

FIG. 6 illustrates a flow diagram of an overview of a method for capturing voices and determining the identity of the speakers. As shown in FIG. 6, the method begins by determining (at 605) the position and orientation of a second device based on data from a first device. The first device is for capturing a position and an orientation of the second device. The first device may be a device that includes a touch sensitive/image capturing screen in some implementations. The second device includes several microphones for capturing sound. In some implementations, the second device (e.g., microphone array) has a movable position and a movable orientation. The second device may include several inductive components. In some implementations, the position and orientation of the second device may be determined by determining where the inductive components of the second device couple a touch sensitive screen. The second device may also include visual indication markers that an image capturing screen may detect to determine the position and/or orientation of a microphone array. Examples of determining the position and/or orientation of the second device using inductive components and/or visual markers are further described in FIGS. 13-17.

The method then assigns (at 610) an object as a representation of a known user. The object has a moveable position. The object may be a virtual object and/or a physical object. In some embodiments, the object may be a graphical user interface element in a graphical user interface of a touch sensitive screen. In some embodiments, the object may be another physical device (e.g., tablet, phone). Next, the method receives (at 615) a position of the object. The position of the object corresponds and/or represents a position of the known user.

The method then processes (at 620) the captured sound to identify a sound originating from the direction of the object. The direction of the object may be relative to the position and the orientation of the second device (e.g., microphone array). In some implementations, processing the captured sound may include searching and analyzing signals and/or data.

After processing (at 620) the captured sound, the method identifies (at 625) a sound originating from the direction of the object as belonging to the known user and ends. In some implementations, the method may loop back (e.g., loops back to 605) to determine whether the position and/or orientation of the microphone array on the screen has changed.

Having provided an overview of a method for capturing sound and identifying the identity of users/speakers, a more detailed method for capturing sound and identifying the identity of users/speakers will now be described. One or more of the devices described in this disclosure may perform the more detailed method.

Figure 7:
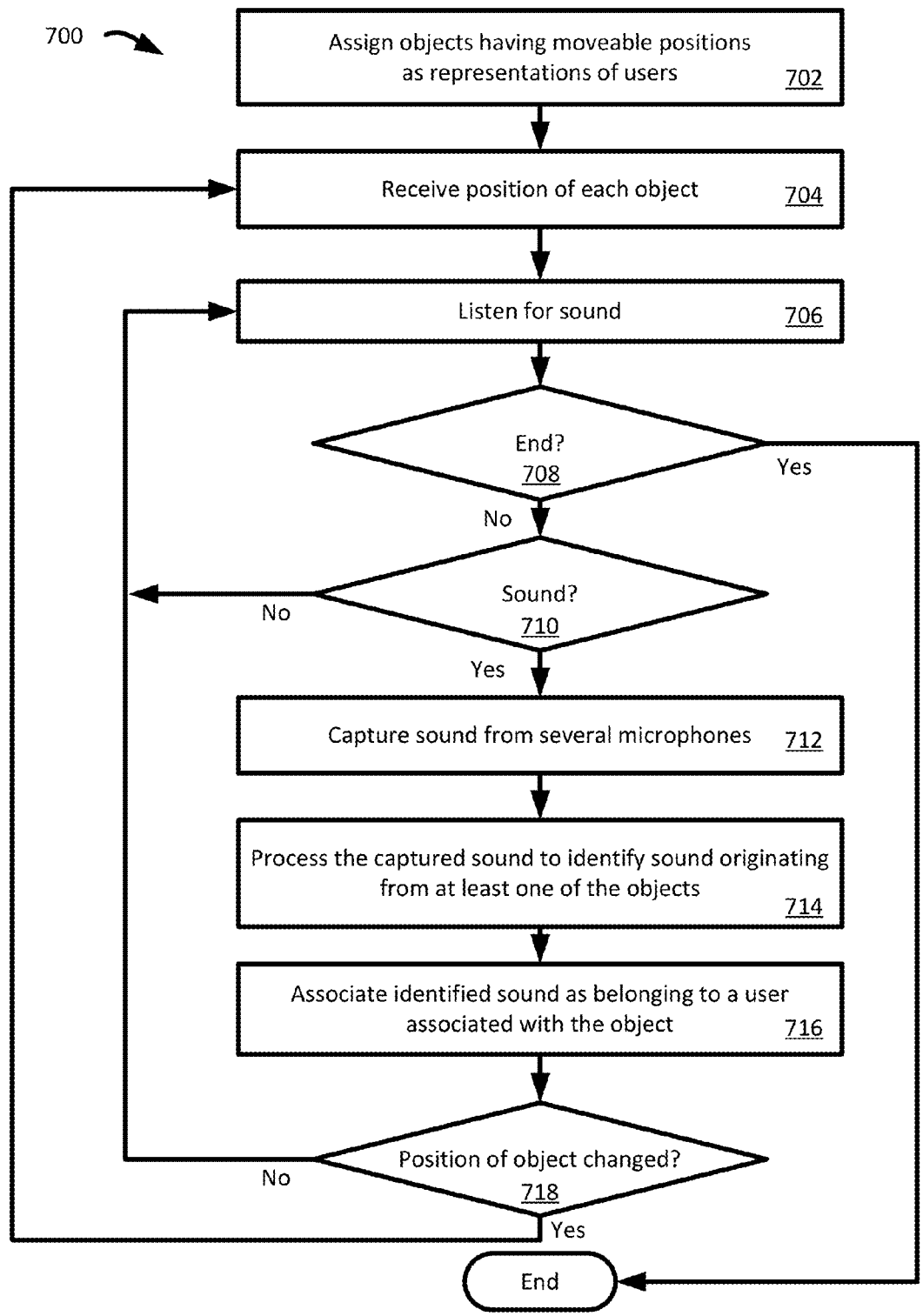
FIG. 7 illustrates a flow diagram of a detailed method for capturing voices and identifying the speakers.

FIG. 7 illustrates a flow diagram of a method for capturing and determining the identity of speakers during a meeting. In some implementations, the method of FIG. 7 may start after identifying the position and orientation of a sound capturing device (e.g., identifying the position and orientation of a microphone array on a touch sensitive/image capturing screen). The position and orientation of the sound capturing device (e.g., microphone array) may be determined by determining where inductive components of the sound capturing device couples the touch sensitive screen in some implementations. The position and orientation of the sound capturing device may be determined by determining where visual markers of the sound capturing device (e.g., microphone array) are located on the touch sensitive screen in some implementations.

As shown in FIG. 7, the method 700 assigns (at 702) each object (e.g., from a set of objects) having a moveable position as a representation of a particular user. These objects identify the identity (e.g., name) of the speakers/participants in the meeting. These objects may be generated internally and/or may be received from an external source (e.g., via email) and then assigned. In some implementations, these objects may be generated prior to a meeting, while in other implementations, these objects are assigned in real-time during a meeting, as users enter and/or participate in the meeting (e.g., when user logs in and/or taps on touch sensitive screen).

Once the objects are assigned (at 702), the method receives (at 704) the position of each of the objects. The position of the objects may be an absolute position or it may be a relative position (e.g., position relative to a microphone array). In some implementations, the objects are assigned with a predetermined positioned during the initial assignment of the objects. Once a new position of a particular object is received, the particular object is assigned the new position. Objects may be many different things. As shown in FIG. 3, an object may be a graphical user interface element (e.g., image, icon) that is displayed on a screen. In such instances, the position of the object is the position of graphical user interface element on the screen and/or relative to the microphone array 100. In other instances, the object may be a physical object, item and/or device (e.g., another microphone array, tablet). Examples of these physical objects, items/devices will be further described in FIGS. 10-11.

Once the position of the objects have been received (at 704) and assigned to the objects, the method listens (at 706) for a sound. Sound may include audio, noise, music, and voice from a speaker. Next, the method determines (at 708) whether to end. If so, the method ends. In some implementations, the method may end when a command is received indicating that the meeting has ended. If the method determines (at 708) not to end, the method then determines (at 710) whether there is sound. If there is no sound, the method proceeds to continue to listen (at 706) for a sound. However, if the method determines (at 710) there is sound, the method captures (at 712) the sound using several microphones. In some implementations, all of the microphones are located on a single unitary device.

After capturing (at 712) the sound, the method processes (at 714) the sound to identify a sound that may have originated from one of the objects. For example, if the method knows that an object is located at an angle of 40 degrees from a microphone array, the method would process the captured sound to identify a sound originating from 40 degrees or coming from that direction (using signal processing/timing techniques and algorithms). The direction of the sound refers to the general direction of where the sound came from. The direction of the sound does not identify the identity of the speaker or person who made the sound. Next, the method associates (at 716) the identified sound originating from a particular object as belonging to a user or person represented/associated with that particular object. When association occurs, then sound originating from the direction the object is directly attributable to the person associated with the object positioned in that direction.

Once the method associates (at 716) the identified sound as belonging to a user/person, the method determines (at 718) whether an object has been moved (e.g., whether a graphical user interface element has moved). If so, the method proceeds to 704 to receive the new position of the objects. If the method determines (at 718) that positions of the objects have not been moved, then the method proceeds to 706 to listen for a sound. In some implementations, the method may also determine whether the position and/or orientation of the sound capturing device (e.g., microphone array 100) have changed. Such a determination may be performed during any stage of the method shown in FIG. 7. A change in the position of the sound capturing device (e.g., microphone array) may result in a redetermination of the position of the objects in some implementations. For example, the method may recompute the position and/or orientation of the objects relative to the position and/or orientation of the sound capturing device (e.g., microphone array) when the position and/or orientation of the sound capturing device have changed.

It should be noted that some or all of the operations described above may be performed locally and/or remotely. In other words, in some implementations, some or all of the operations may be performed by the microphone array, a local device (e.g., local device in the table that integrates a touch sensitive image capturing screen), and/or one or more remote devices connected to the microphone array and/or local device.

Figure 8:
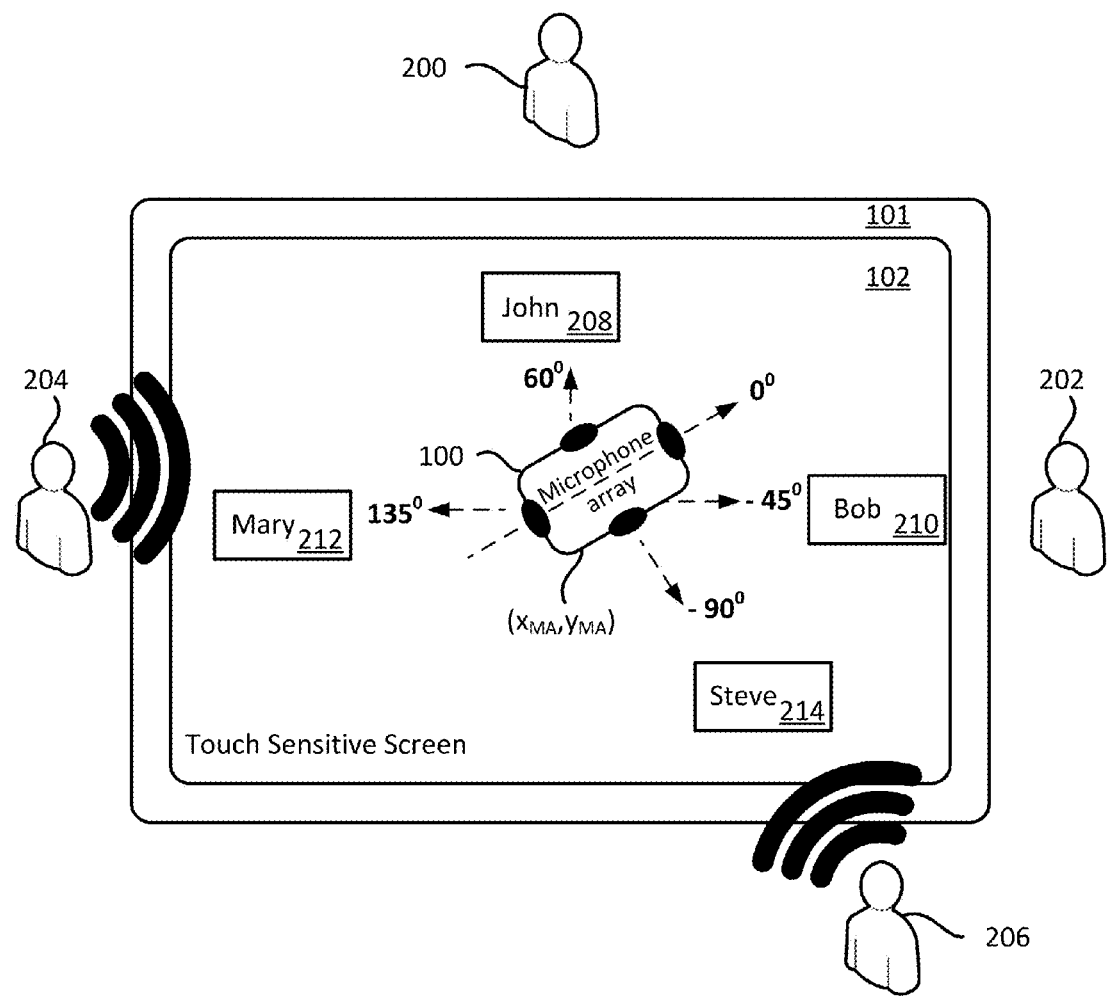
FIG. 8 illustrates how the position and orientation of a microphone array may be used to identify the source and identity of sound.
Figure 9:
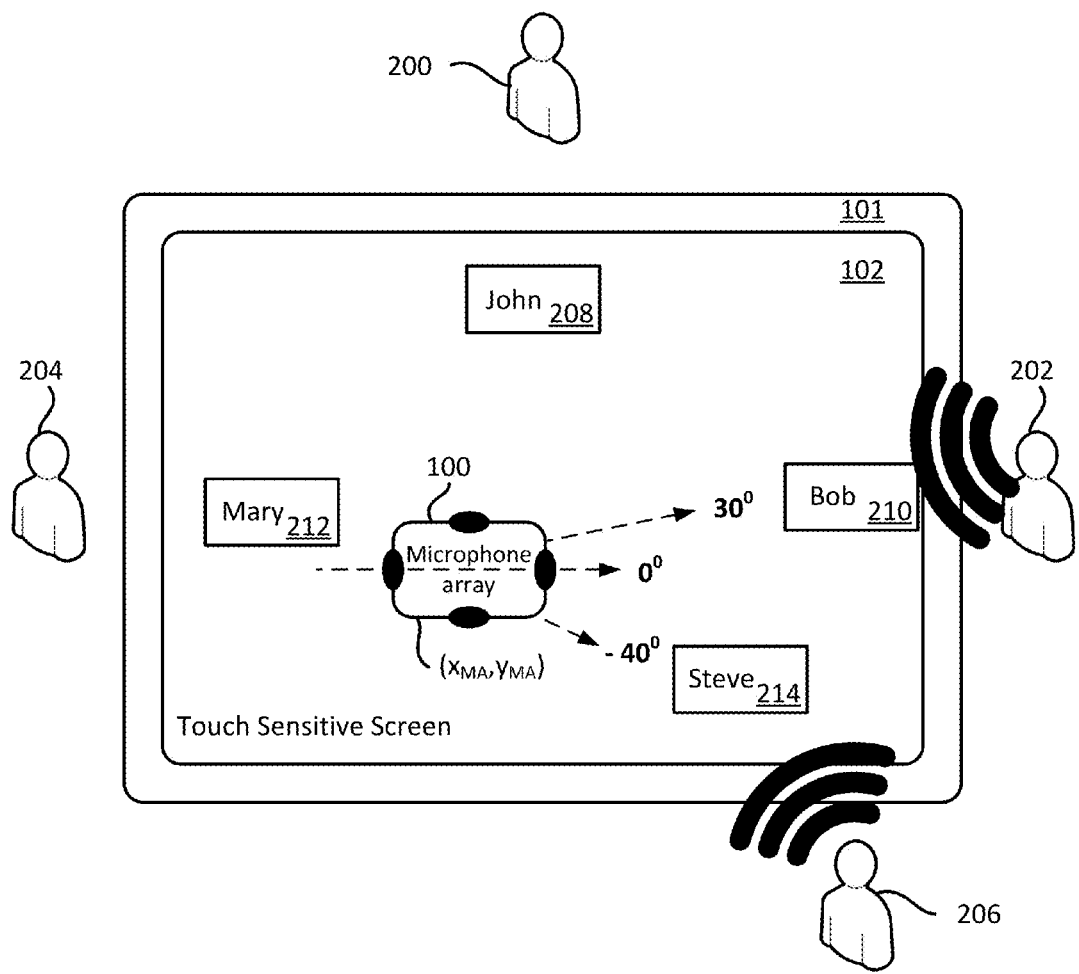
FIG. 9 illustrates how the position and orientation of a microphone array may be used to identify the source and identity of sound.

FIGS. 8-9 conceptually illustrate how the position and orientation of a microphone array may be used to identify the source and identity of sound in some implementations.

FIG. 8 illustrates a microphone array 100 on a screen 102 of a device 101. The device 101 may be integrated with a surface table in some implementations. The microphone array 100 is orientated in a particular direction/orientation (e.g., 0 degree). The screen 102 may be a touch sensitive screen and/or an image capturing screen. The microphone array 100 is located at a particular position (e.g., XMA, YMA) on the screen 102. FIG. 8 also illustrates several graphical user interface (GUI) elements (e.g., GUI elements 208-214). Each GUI element represents/is associated with a user (e.g., users 200-206). For example, GUI element 214 is associated with user 206, and GUI element 212 is associated with user 204. As shown in FIG. 8, the GUI element 214 is positioned negative 90 degrees (or 270 degrees) relative to the position and/or orientation of the microphone array 100 on the screen 102. The GUI element 212 is positioned 135 degrees relative to the position and/or orientation of the microphone array 100 on the screen 102.

In this example, a captured sound originating about or approximately negative 90 degrees from the microphone array 100 is associated with the user 206. Similarly, a captured sound originating about 135 degrees from the microphone array 100 is associated with the user 204. In some implementations, the degrees shown in FIG. 8 are approximations or ranges of the relative position/orientation of the GUI element or user with respect to the microphone array. In such instances, approximately negative 90 degrees may represent negative 90 degrees±5 degrees for example. However, different implementations may use different degree tolerances.

One benefit of the above approach is that it avoids having to process the captured sound signal across all degrees. Instead of searching and analyzing every single sound signal from every single angle (e.g., all 360 degrees), the microphone array and/or device may be able to only analyze a subset of a captured sound signal. That is, the microphone array and/or device may be able to limit its search and analysis (e.g., processing) of sound signals to a more limited subset of the sound signals, which can save a lot of time. In the example of FIG. 8, the microphone array 100 and/or device may limit its search and analysis of a captured sound to sound originating from about −90, negative 45, 60, and 135 degrees. Again, it should be noted that the degrees mentioned above may represent a range of degrees (e.g., negative 90 degrees±5). As such, the search and analysis of a captured sound may be performed for in a range of degrees, as opposed to a specific degree in some implementations.

During the course of a meeting, the microphone array may move, change position or orientation on the screen. In some implementations, when the position and/or orientation of the microphone array changes, adjustments may be made in order to properly process a subsequent captured sound.

FIG. 9 illustrates an example of a microphone array that has been moved. As shown in FIG. 9, the microphone array 100 is positioned in a new position on the screen 102 and oriented in a new particular direction. As a result of the new position and new orientation, the GUI elements (e.g., 208-214) have a new relative orientation to the microphone array 100. For example, the GUI element 210 is now positioned at an angle of about 30 degrees from the microphone array 100 (instead of the previous negative 45 degrees) and the GUI element 214 is positioned at angle of about negative 40 degrees (320 degrees) from the microphone array 100 (instead of the previous negative 90 degrees). As a result, a subsequent captured sound originating from about 30 degrees will now be associated with the user 202, while a subsequent captured sound originating from about negative 40 degrees will now be associated with the user 206. Similar adjustments will be made for the other GUI elements and users.

Figure 10:
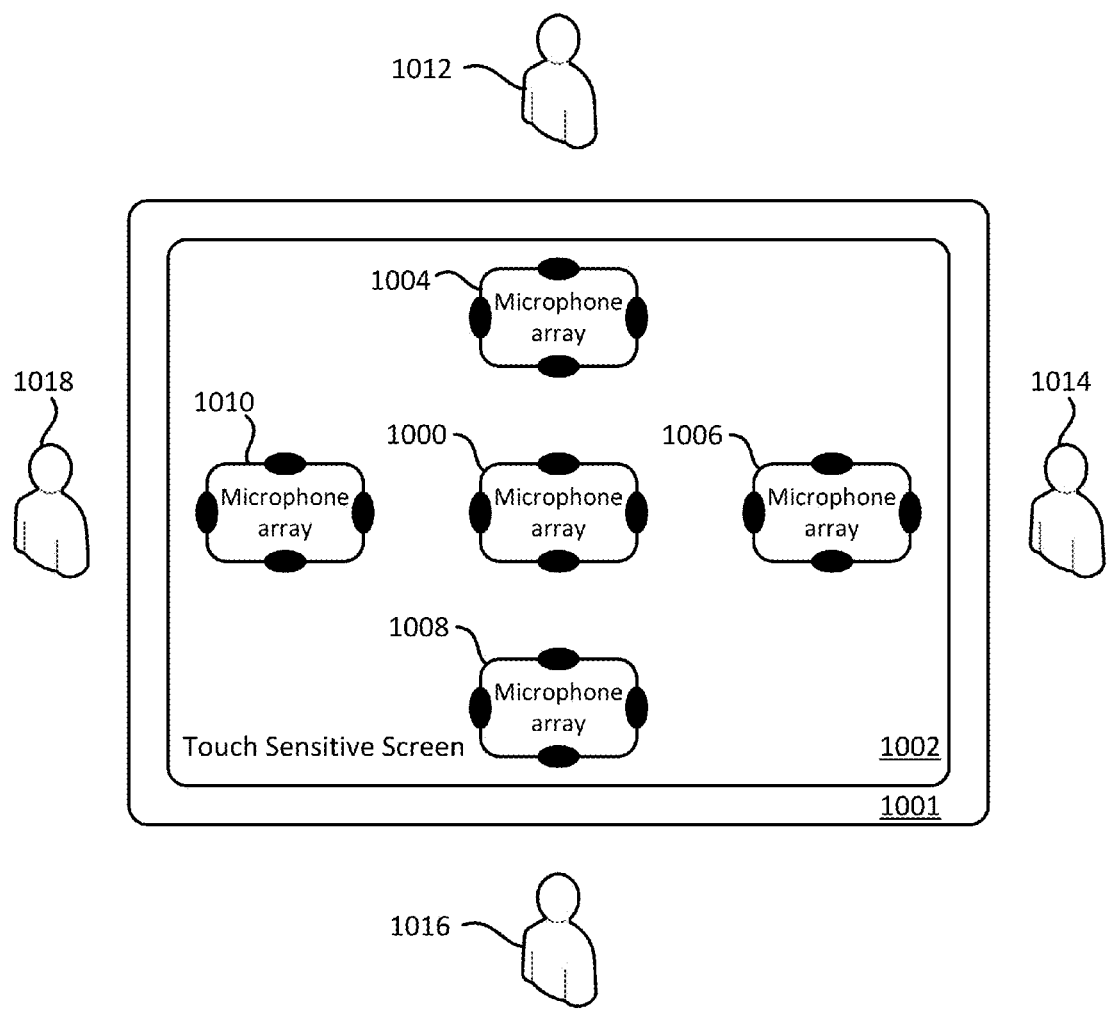
FIG. 10 illustrates a system that includes several microphone arrays and a device having a touch sensitive screen.

FIGS. 2-5 illustrate objects that are based on graphical user interface elements on a screen. In some implementations, the objects are physical objects, items (e.g., another microphone array, tablet, phone). FIGS. 10-11 illustrate instances where the objects are physical objects/items.

FIG. 10 illustrates a configuration with several microphone arrays. FIG. 10 is similar to FIG. 3, except that instead of graphical user interface elements, additional microphone arrays are used. As shown in FIG. 10, the system includes a microphone array 1000 and a device 1001. The device 1001 may be similar to the device 101 of FIG. 1. In some implementations, the device 1001 is integrated in a surface table. The device 1001 may also include a touch sensitive screen 1002. The microphone array 1000 is in communication with the device 1001 via at least one communication link using at least one communication protocol (e.g., WiFi, Bluetooth, ZigBee, and/or NFC). In addition, there are four microphone arrays 1004-1010. Each microphone array 1004-1010 is associated to a particular user/person 1012-1018. For example, the microphone array 1004 is associated with the user 1012, the microphone array 1006 is associated with the user 1014, and the microphone array 1008 is associated with the user 1016 and the microphone array 1000 is associated with the user 1018. The microphone array 1000 is the central microphone array and the other microphone arrays 1004-1010 communicate with the microphone arrays 500 via at least one communication link using at least one communication protocol (e.g., WiFi, Bluetooth, ZigBee, and/or NFC). Some or all of the microphone arrays 1000 and 1004-1010 may be the microphone array 100 of FIG. 1 in some implementations.

Various methods may be used to determine the position and/or orientation of the microphone arrays 1000 and 1004-1010. In some implementations, the position and/or orientation of the microphone arrays 1000 and 1004-1010 is based on the position and/or orientations of the microphone arrays relative to the touch sensitive screen 1002. In some implementations, the position and/or orientation of the microphone arrays 1000 and 1004-1010 is determined by using ultrasonic/infrared/sonic pulses. Moreover, any of the components and methods described above for the microphone array 100 may be used to determine the position and/or orientation of the microphone arrays 1000 and 1004-1010.

Figure 11A:
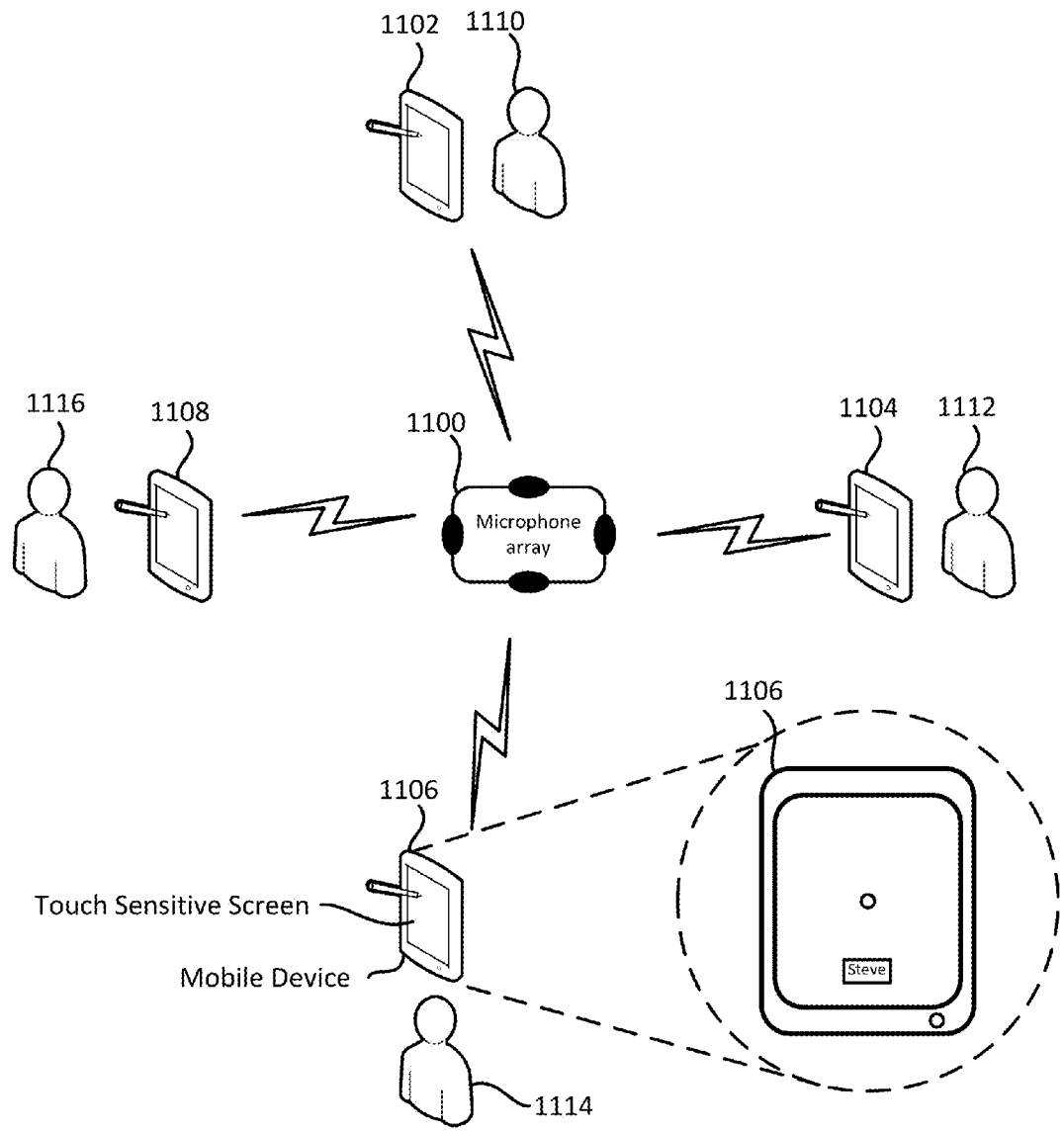
FIG. 11A illustrates a system that includes a microphone array and several devices.
Figure 12A:
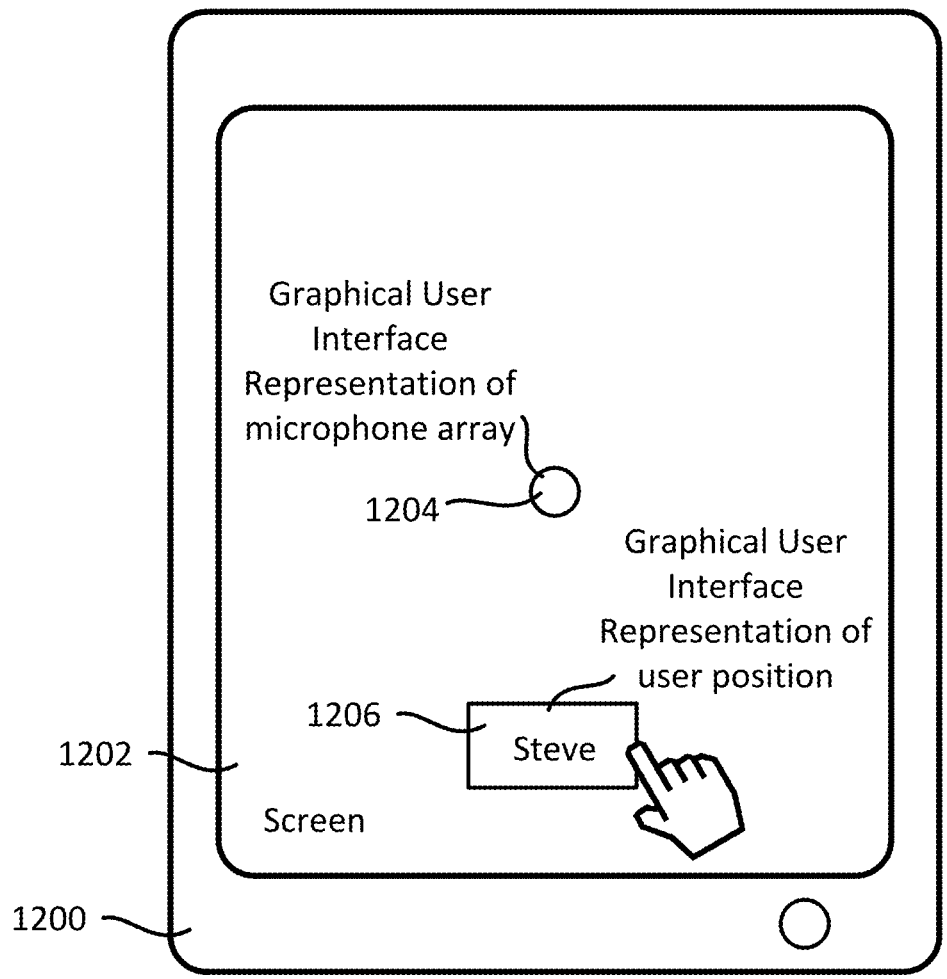
FIG. 12A illustrates a device that allows a user to specify its position relative to a microphone array.
Figure 12B:
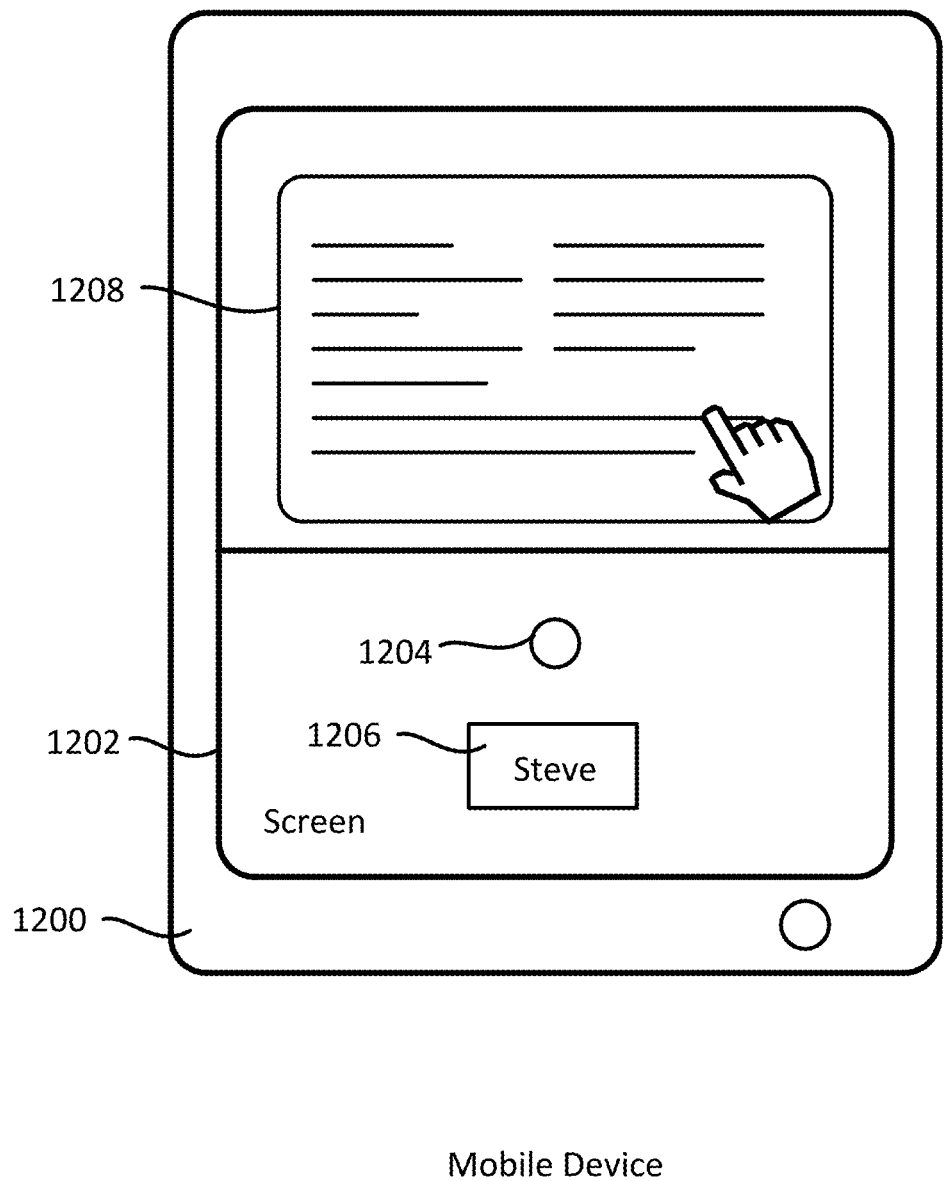
FIG. 12B illustrates a device that allows a user to specify its position relative to a microphone array, where the device is capable of displaying transcribed captured voice.

FIG. 11A illustrates another configuration that may be implemented using additional devices. As shown in FIG. 11A, a microphone array 1100 is in communication with several mobile devices 1102-1108 (e.g., handset, and/or tablet). Each of these mobile devices is associated with a respective user/person 1110-1116. A mobile device may be a handset, a tablet, a phone, a smart phone, a portable electronic device, an electronic notepad, and/or a personal digital assistant (PDA). The mobile device may be able to communicate with other devices via a cellular network and/or other communication networks. An example of a mobile device (e.g., handset, and/or tablet) is shown in FIGS. 12A-12B, which is further described below.

As in the case of FIG. 10, the position of the mobile devices 1102-1108 may be determined by using ultrasonic/infrared/sonic pulses. The mobile devices 1102-1108 may allow a user to "check in" and/or register with the microphone array 1100. (e.g., check in using NFC by tapping the mobile device near the microphone array 1100). However, different implementations may "check-in" and/or register with the microphone array 1100 differently. For example, a mobile device may use another communication protocol or communication link (e.g., Bluetooth, and/or WiFi) to communicate with the microphone array 1100. Once the user/mobile device is "checked-in" or is registered, the mobile device may be tracked by the microphone array using ultrasonic/infrared/sonic pulses (or other known tags), which allows the microphone array 1100 to continuously know the position/location of the mobile device, which consequently means the microphone array 1100 knows the position/location of the user associated with the mobile device being tracked.

Each mobile device 1102-1108 may provide a graphical user interface on its respective screen that allows a user to specify the position/location of the user and/or device (e.g., tablet) relative to the microphone array 1100. That is, a user may indicate on the mobile device's screen the user's position which is then transmitted (e.g., via Bluetooth, and/or WiFi) to the microphone array 1100 and/or another device (e.g., device 1001). The graphical user interface on the screen of the mobile device (e.g., mobile devices 1102-1108) may also provide/display text (e.g., transcribed captured voice). Such text may be provided/transmitted from the microphone array 1100 and/or another device in communication with the microphone array 1100. Examples of such graphical user interfaces on a screen of a mobile device are further described in FIGS. 12A-12B.

The microphone array 1100 may be located on a table (not shown) or a touch sensitive screen (not shown in the example of FIG. 11A) of a device integrated on a table. Similarly, the mobile devices 1102-1108 may be positioned on the table or a touch sensitive screen of a device integrated on a table.

Figure 11B:
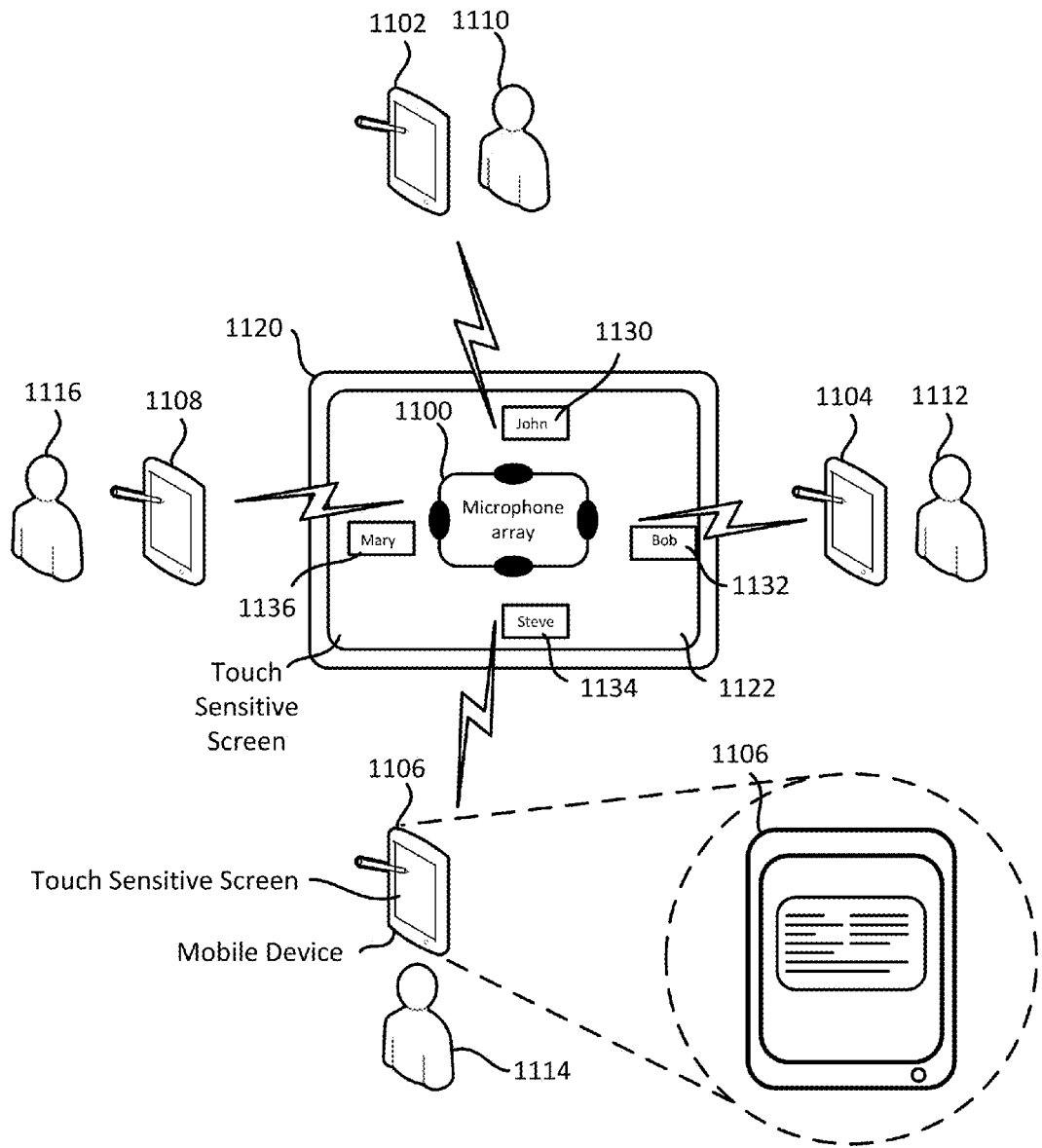
FIG. 11B illustrates another system that includes a microphone array and several devices.

FIG. 11B illustrates another configuration that may be implemented using a different device. FIG. 11B is similar to FIG. 11A except that microphone array 1100 is located on a touch sensitive screen 1122 of a device 1120 and the position of the users is specified on the graphical user interface of the touch sensitive screen 1122 of the device 1120. As shown in FIG. 11B, the mobile devices 1102-1108 (e.g., handset, and/or tablet) are in communication (e.g., using Bluetooth, and/or WiFi) with the microphone array 1100 and/or device 1120.

As further shown in FIG. 11B, users specify their positions relative to the microphone array 1100 by specifying the position/location of graphical user interface elements. As shown in FIG. 11B, there are four graphical user interface elements 1130-1136 displayed on the graphical user interface shown in the screen 1122. Each graphical user interface element 1130-1136 is associated with a particular user and/or mobile device. The graphical user interface element may include a text or image (e.g., ID, name, picture) identifying the user that the user interface element is associated with. Different implementations may present the graphical user interface elements differently. In some implementations, a graphical user interface element is presented with the user taps the screen and/or logs in. In some implementations, the graphical user interface element may be presented when the user "check-in" and/or registers with the microphone array 1100 and/or device 1120 using one of the exemplary methods described above in FIG. 11A (e.g., checking in using NFC by tapping the microphone array 1100 and/or device 1120). Since the mobile devices 1102-1108 are in communication with the microphone array 1100 and/or device 1120, the mobile devices 1102-1108 may receive data from either or both the microphone array 1100 and device 1120. Such data may be presented/displayed on the screen of the mobile devices 1102-1108. Examples of data include transcribed text of captured voice in some implementations.

Figure 11C:
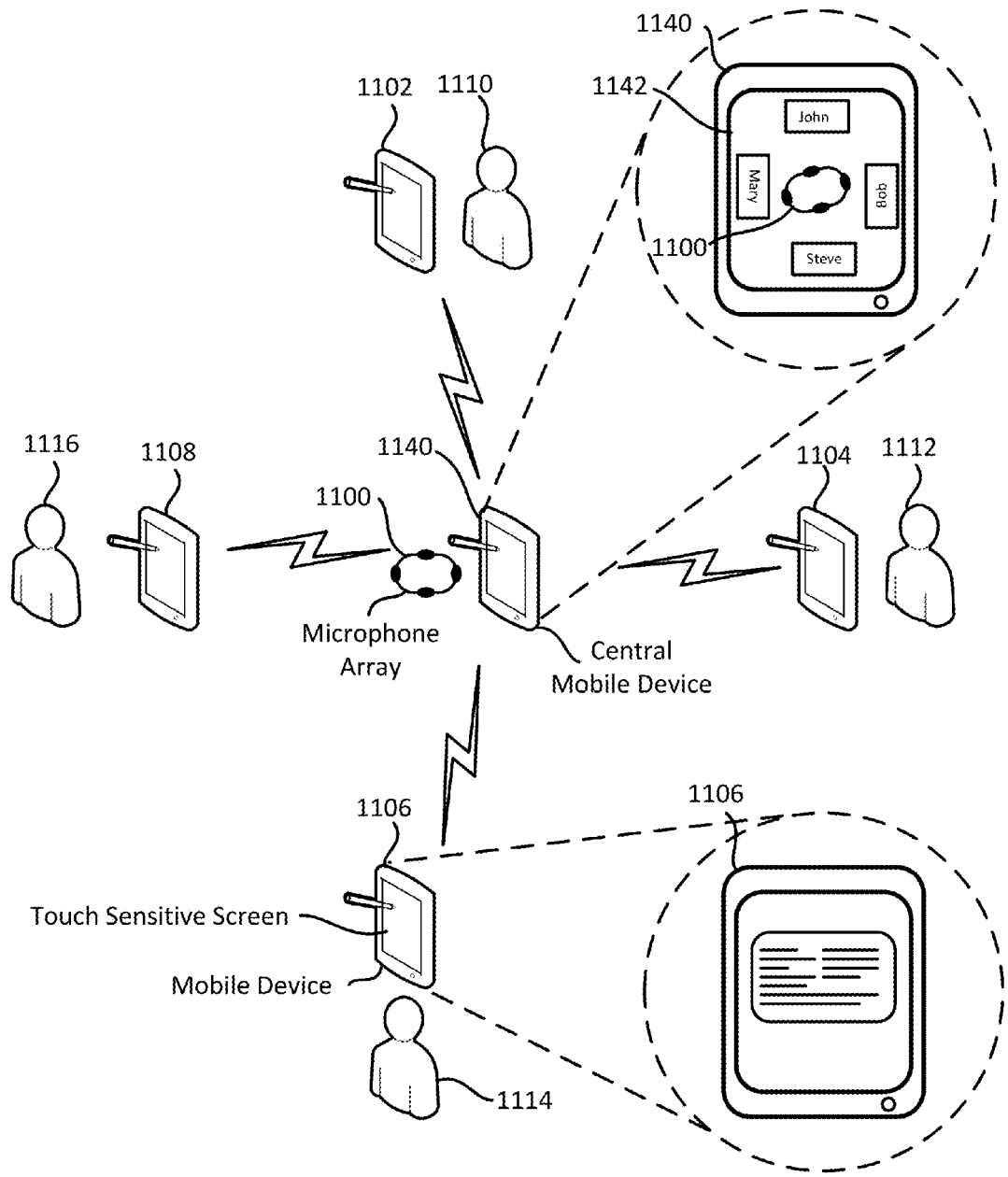
FIG. 11C illustrates another system that includes a microphone array, a central mobile device and several devices.

In some implementations, the device 1120 is a mobile device (e.g., tablet, handset). This may be possible when the screen size of the mobile device is sufficiently large enough for the microphone array 1100 to be positioned on the screen of the mobile device. In such instances, the mobile device may serve as a central mobile device (e.g., central tablet) on which the microphone array 1100 is positioned on. FIG. 11C illustrates an example of a configuration that include a central mobile device (e.g., central tablet). As shown in FIG. 11C, the mobile devices 1102-1108 (e.g., handset, and/or tablet) are in communication (e.g., using Bluetooth, and/or WiFi) with the microphone array 1100 and/or central mobile device 1140. The central mobile device 1140 includes a touch sensitive screen 1142, on which the microphone array 1100 may be placed on. It should be noted that any of the mobile devices 1102-1108 may function as a central mobile device in some implementations.

The configuration of FIG. 11C is similar to the configuration of FIG. 11B, except that device 1120 (which may be a surface table/surface tablet) of FIG. 11B has been replaced with a mobile device 1140 (e.g., tablet, and/or smart phone), which functions as a central mobile device in communication with other mobile devices (e.g., mobile devices 1102-1108). In some implementations, the operation of the configuration shown in FIG. 11C is similar to the operation of the configurations shown and described in FIGS. 11A-11B. That is, for example, in some implementations, users may "check-in", register and/or log in with the microphone array 1100 and/or the central mobile device 1140 using NFC or other communication protocols/links (e.g., Bluetooth, and/or WiFi).

FIG. 12A illustrates a mobile device that a user may use to specify the user's position relative to a microphone array. The mobile device may be a tablet or a handset (e.g., smart phone). The mobile device 1200 of FIG. 12A may correspond to any of the mobile devices 1102-1108 of FIGS. 11A-11C in some implementations. As shown in FIG. 12A, the mobile device 1200 (e.g., handset, and/or tablet) includes a touch sensitive screen 1202 that has a graphical user interface. The graphical user interface includes a first graphical user interface element 1204 and a second graphical user interface element 1204. The first graphical user interface element 1204 is a representation of a microphone array (e.g., microphone array 1100 of FIG. 11A) and the second graphical user interface object 1206 is a representation of a user/device (e.g., user 1114/mobile device 1106). In some implementations, a user may specify its own position relative to a microphone array by positioning/moving the first graphical user interface element 1204 and/or the second graphical user interface element 2006 on the touch sensitive screen 1202. Once the position is specified on the device 1200, the device 1200 may transmit to a microphone array (microphone array 1100) and/or another device (e.g., device 1120) coupled to the microphone array, the position of the user/mobile device.

FIG. 12B illustrates that a graphical user interface of a screen of a mobile device may include addition data/information. As shown in FIG. 12B, the screen 1202 also include a region 1208 that includes text. In some implementations, the text is transcribed text of captured voice from a microphone array (e.g., microphone array 1100). The data that includes the transcribed text may be transmitted by a microphone array (e.g., microphone array 1100) and/or a device (e.g., device 1120). The transcription of captured voice/sound will be further described below.

As described above, some implementations of capturing sound and identifying a speaker includes determining the position and orientation of a microphone array. Examples of determining the position and orientation of a microphone array are described below.

Different implementations may determine the position and orientation of a microphone array differently. As described above, some implementations determine the position and orientation of the microphone array by using one or more inductors (e.g., inductive components). In addition, some implementations may determine the position and orientation of the microphone array by using visual markers which can be captured by an image capturing screen. The image capturing screen may be part of a touch sensitive screen in some implementations. That is, in some implementations, a touch sensitive screen may also include image capturing functionality/capability. The use of inductors and/or visual markers will now be described below.

Figure 13:
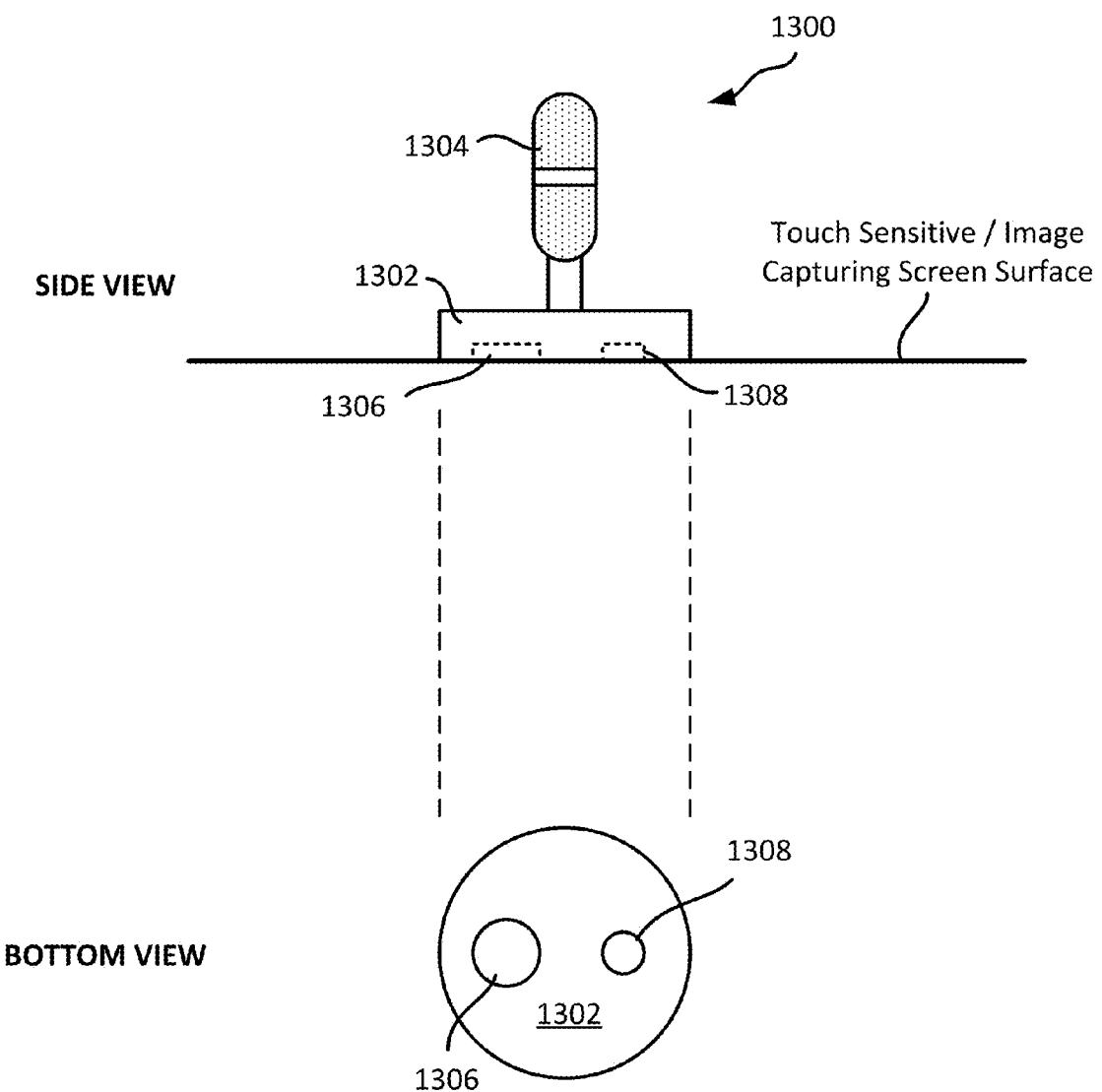
FIG. 13 illustrates a microphone array that includes several inductors.

FIG. 13 illustrates a microphone array (e.g., sound capturing device) that includes inductors (e.g., inductive components) that may be used to determine the position and orientation of the microphone array on a screen. As shown in FIG. 13, the microphone array 1300 includes a base portion 1302 and a microphone housing 1304. The microphone housing 1304 may include several microphones for capturing sound. The base portion 1302 may include a first inductor 1306 and a second inductor 1308. The inductors 1306-1308 may affect a touch sensitive screen surface (e.g., change an electrical field in a portion of the touch sensitive screen) when the microphone array 1300 is positioned on or near a touch sensitive screen surface, which allows a system/device to determine the position and location of the microphone array 1300 on the touch sensitive screen in some implementations. The microphone array 1300 may be any of the microphone array described in the present disclosure (e.g., microphone array 100).

Figure 14:
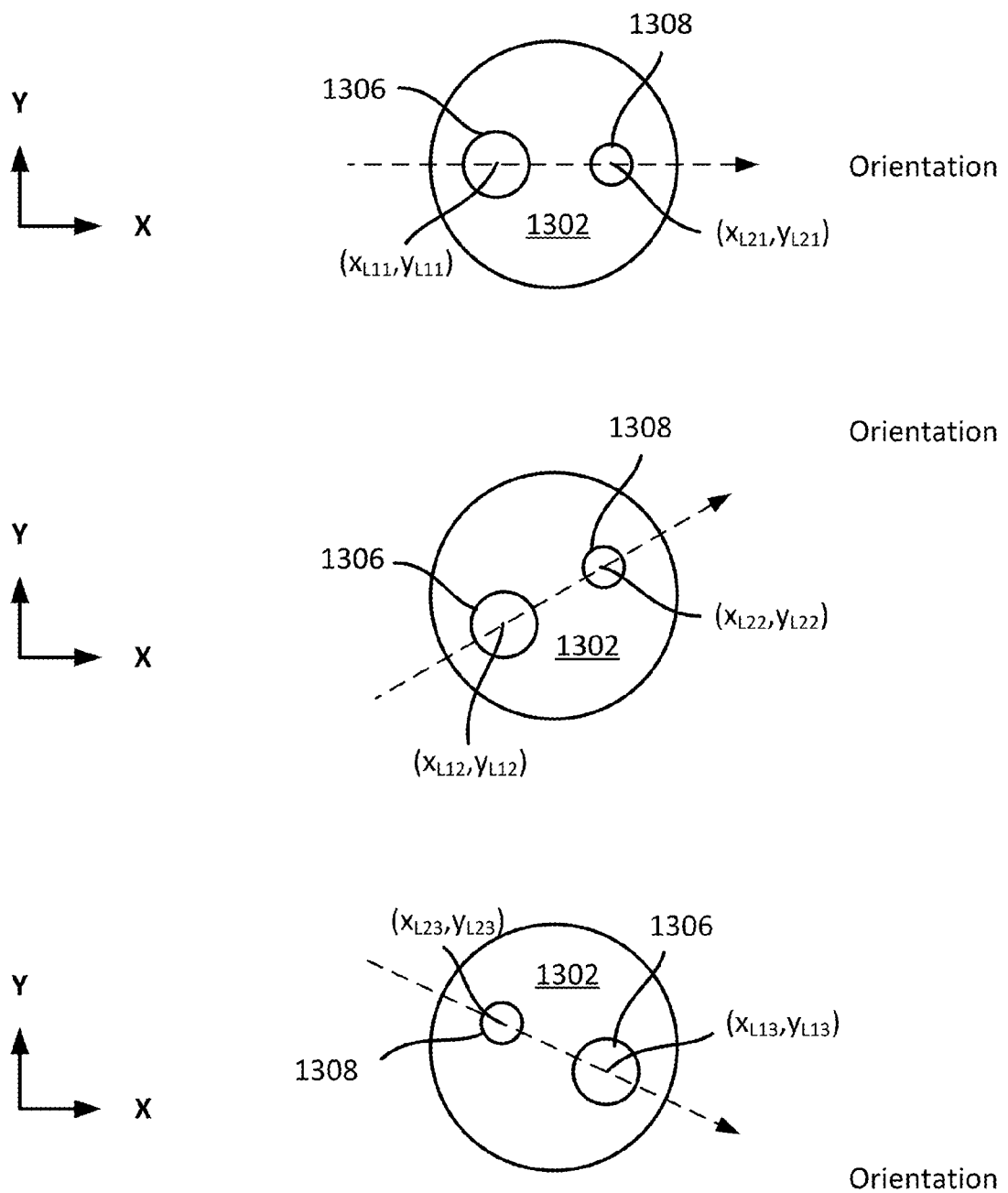
FIG. 14 illustrates the orientation of microphone array based on the orientation of inductors on the microphone array.

FIG. 14 illustrates how the position and orientation of a microphone array on a touch sensitive screen may be determined. As shown in FIG. 14, each inductor (e.g., inductive component) may have a position (e.g., X-Y coordinate) on a touch sensitive screen. In some implementations, the position of each inductor (e.g., first inductor 1306, second inductor 1308) may be determined by what portion of the touch sensitive screen is affected by an electrical field due to each inductor in the microphone array. For example, the first inductor 1306 has a first inductor position (XL11, YL11) and the second inductor 1308 has a second inductor position (XL21, YL21). The first inductor 1306 is larger than the second inductor 1308. In some implementations, the first inductor will produce/induce/generate a larger electric field than the second inductor. Thus, in some implementations, a device/system may be able to distinguish between the first and second inductors based on the strength of the electrical field that is detected/measured by the touch sensitive screen.

Once the positions of the inductors on the touch sensitive screen are known, the position of the microphone array may be determined as well. In some implementations, the position of the microphone array (e.g., microphone array 1300) may correspond to the position of the first inductor, the second inductor or be based on the positions of the first and second inductors (e.g., average position of the first and second inductors).

To determine the orientation of the microphone array, some implementations may compute an orientation of the inductors in the microphone array. As shown in FIG. 14, the orientation of the inductors may be conceptually represented by an imaginary straight line that connects the position of the two inductors (e.g., imaginary straight line that connects the center portion of the two inductors). The direction of the imaginary straight line may be from the first inductor to the second inductor (e.g., larger inductor to smaller inductor), or vice versa. Thus, in some implementations, the orientation and/or direction of the microphone array corresponds to/is based on the orientation and/or direction of the inductors. For example, in some implementations, the orientation and/or direction of the microphone array corresponds to the orientation and/or direction of the imaginary straight line that connects the two inductors 1306-1308. However, different implementations may assign and compute the orientation differently.

Another approach to determining the position and/or orientation of a microphone array is to use an image capturing functionality that some touch sensitive screen may have. That is, in some implementations, the touch sensitive screen may also be a touch sensitive image capturing screen. In such instances, the image capturing may be performed by an image capturing device/system (e.g., an infrared (IR) system) that is partially or fully integrated in the screen. In such an exemplary configuration, a light (e.g., IR light) may be projected from the screen and hits an object (e.g., microphone array) that may be on or near the screen. That light is then reflected back inside the screen and detected by integrated sensors inside the screen. The light signals from the integrated sensors may then be converted into electrical signals, which are then analyzed. In some instances, analyzing the electrical signals may include generating an image/picture of the object that is on or near the screen and performing image processing operations on the image (e.g., analyzing shape, position, color). Different implementations may use different image capturing approaches to detect/analyze an object that is located on or near the surface of a screen.

In view of the fact that some screens may be able to detect and capture images of an object on or near the surface of a screen, some implementations may be capable of detecting the position and/or orientation of a microphone array on a screen based on the shape of the microphone array and/or visual markers on the microphone array. It should be noted that at least some of the touch sensitive screens described in the present disclosure may include image capturing functionality/capability. For example, these image capturing screens may be part of a surface table, surface tablet, and/or mobile devices (e.g., tablet, handset, smart phone) in some implementations. Thus, at least some of the touch sensitive screens (e.g., touch sensitive screen 102) described in the present disclosure may also be a touch sensitive image capturing screen.

Figure 15:
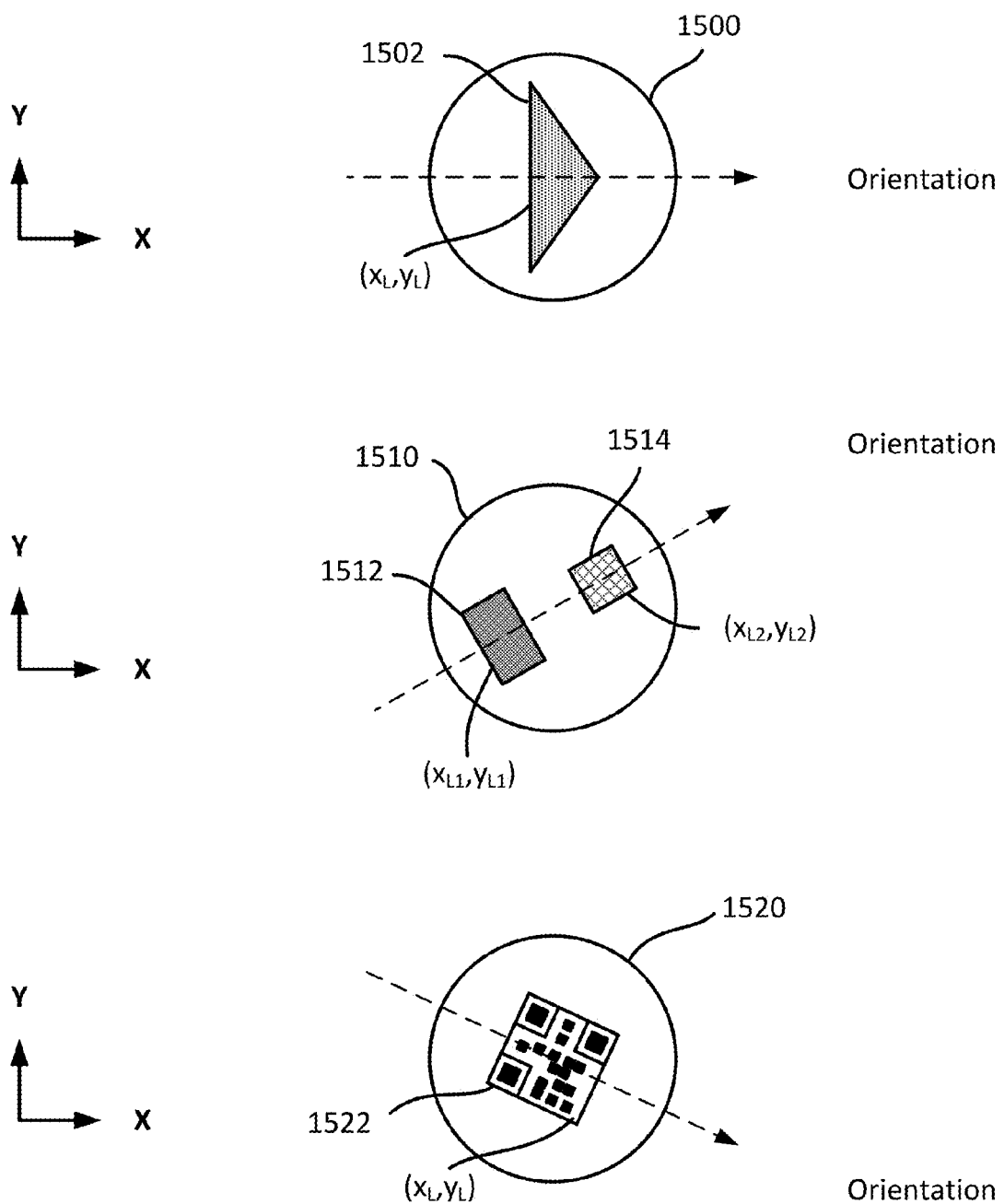
FIG. 15 illustrates the orientation of microphone array based on the orientation of one or more visual markers on the microphone array.

In some implementations, the base portion of the microphone array (or other portions of the microphone array) may have a distinctive and/or unique shape which allows the image capturing screen to detect and identify the microphone array, as well as the position and/or orientation of the microphone array. In some implementations, the base portion of the microphone array may include one or more visual markers. These visual markers may be used to detect and identify the microphone array, as well as the position and/or orientation of the microphone array in some implementations. FIG. 15 illustrates various different examples of visual markers.

In one example, the base portion 1500 of a microphone array (e.g., microphone array 100, microphone array 1300) may include a visual marker with a distinctive and/or unique shape, size and/or color. As shown in FIG. 15, the base portion 1500 includes a visual marker 1502 that has a triangular shape. The visual marker 1502 has a position (e.g., XL, YL) on the screen. The position of the microphone array may be based on the position of the visual marker 1502 on the screen in some implementations. The shape and/or orientation of the visual marker 1502 may be representative of the orientation of the microphone array in some implementations. For example, if the visual marker was in the shape of an arrow, then the direction in which the arrow is pointed would be the orientation of the microphone array as well in some implementations.

The visual marker 1502 may also have a particular color and/or reflective property that may be different than the color and/or reflective property of the base portion 1500. The differences in the color and/or reflective property of the visual marker may allow the image capturing screen to better distinguish the visual marker 1502 from the base portion 1500 in some implementations.

In another example, the base portion 1510 may include several visual markers as shown in the second drawing of FIG. 15. These visual markers may be located on a bottom surface of the base portion 1510. Each visual marker may have its own shape, size, color, and reflective property in some implementations. For example, the base portion 1510 includes a first visual marker 1512 and a second visual marker 1514. The first visual marker 1512 has a first position (e.g., XL1, YL1), a first shape, a first color and a first reflective property that is different than the color and reflective property of the base portion 1510. The second visual marker 1514 has a second position (e.g., XL2, YL2), a second shape, a second color and a second reflective property that is different than the color and reflective property of the base portion 1510. The position of the microphone array on the screen may be based on the position of one or more visual markers on or near the screen in some implementations.

The orientation of the microphone array may be determined/computed based on the orientation of the visual markers (e.g., 1512, 1514) in the microphone array. As shown in FIG. 15, the orientation of the visual markers 1512-1514 may be conceptually represented by an imaginary straight line that connects the position of the two visual markers (e.g., imaginary straight line that connects the center portion of the two visual markers). The direction of the imaginary straight line may be from the first visual marker 1512 to the second visual marker 1514, or vice versa. Thus, in this example, the orientation and/or direction of the microphone array corresponds to the orientation and/or direction of the imaginary straight line that connects the two visual markers 1512-1514. However, different implementations may assign and compute the orientation differently.

In yet another example, the base portion 1520 may include a quick response (QR) code 1522 as shown in the third drawing of FIG. 15. The QR code 1522 may be used to determine the position and/or orientation of the microphone array on or near the screen. That is, the position and/or orientation of the microphone array may be based on the position and/or orientation of the QR code 1522 in some implementations. In addition, the QR code 1522 may also be used to identify the particular type of microphone array on the screen in some implementations.

It should be noted that inductors (e.g., inductive components) may also be used a visual markers in some implementations. That is, the inductors may have a shape, color and/or reflective property that is distinct and unique enough for an image capturing screen to determine the position and/or orientation of the inductors, and consequently the position and/or orientation of the microphone array in some implementations. It should also be noted that the two approaches (e.g., using touch approach and/or image capture approach) for determining the position and/or orientation of the microphone array are not mutually exclusive. As such, a device that includes a touch sensitive image capture screen may use one or both approaches to determine the position and/or orientation of the microphone array. Such a device that has dual position and/orientation determining capabilities (e.g., can use the touch or image capture approach) would allow different types of microphone arrays to be used. For example, one user may have a microphone array with inductors, while another user may have a microphone array with a QR code. In such a scenario, the touch approach may be used on the microphone array that has the inductors, while the image capture approach may be used on the microphone array that has the QR code. However, different implementations may use different approaches. It should also be noted that the coordinate system described in the disclosure is one of many different coordinate systems that may be used to determine the position and/or orientation of an object and/or device.

Having described various approaches for determining the position and/or orientation of a microphone array on a screen, flow diagrams for methods for determining the position and/or orientation of a microphone array will now be described below.

Figure 16:
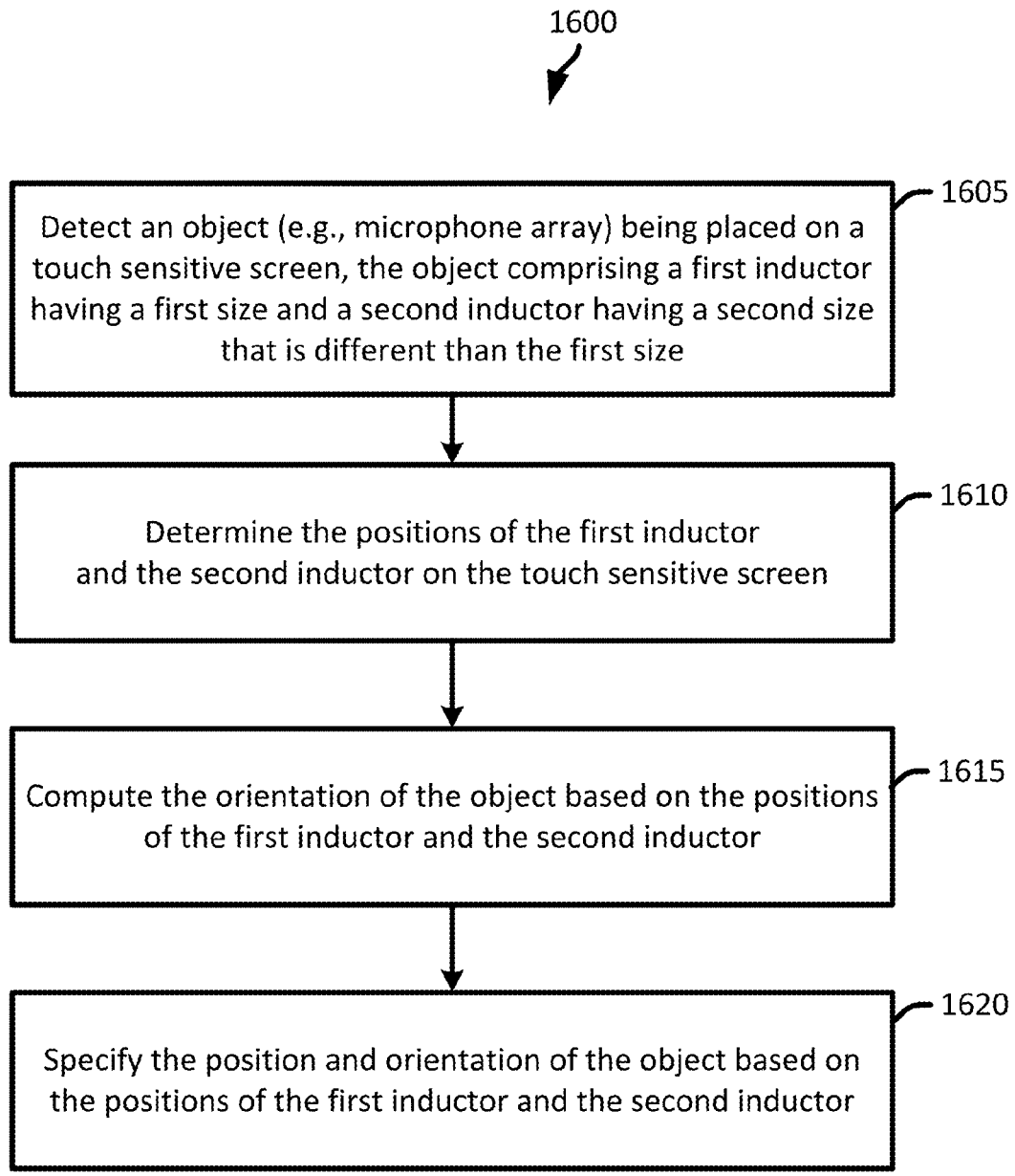
FIG. 16 illustrates a flow diagram of a method for determining the position and orientation of a microphone array.

FIG. 16 illustrates a flow diagram of a method for determining the position and orientation of a microphone array based on the position of inductors. The method of FIG. 16 may be performed by a microphone array, a device (e.g., device that includes touch sensitive image capture screen), and/or a system that includes a microphone array. In some implementations, the method 1600 of FIG. 16 is performed during step 605 of FIG. 6. As shown in FIG. 16, the method begins by detecting (at 1605) an object (e.g., microphone array) being placed on a touch sensitive screen. The object has a first inductor and a second inductor. The first inductor has a first size that is greater than the second size of the second inductor. In some implementations, the size of the inductors may correspond to the size/strength of the electric field that the inductors may generate/induce on a portion of a touch sensitive screen. For example, a larger size inductor may induce a larger electric field than a smaller size inductor. In some implementations, detecting (at 1605) that an object has been placed on a touch sensitive screen may include detecting an electric field or a change in electric field on one or more portions of the touch sensitive screen.

Next, the method determines (at 1610) the positions of the first inductor and the second inductors on the touch sensitive screen. In some implementations, this determination may include determining where the first and second inductors are coupled to the touch sensitive screen (e.g., where the first and second inductors touch the touch sensitive screen). The positions of the first and second inductors may correspond to the position/location on the touch sensitive screen that the first and second inductors touch in some implementations.

The method then computes (at 1615) the orientation of the object based on the positions of the first and second inductors. Different implementations may use different methods for computing the orientation of an object. As described above, FIG. 14 illustrates exemplary ways that the orientations and/or direction of an object may be computed based on the position of inductors. For example, the orientation of the object may correspond to the direction of an imaginary straight line from a first inductor to a second inductor.

Once the positions of the inductors are determined, the method may specify (at 1620) the position and orientation of the object based on the position of the inductors (e.g., first inductor, second inductor). In some implementations, once the position and orientation of the object (e.g., microphone array) is specified, the position and orientation of the object may be used to identify a speaker during a conference. In some implementations, multiple iterations of the method of FIG. 16 are performed during a meeting. That is, in some implementations, the method may continuously determine the position and/or orientation of the object (e.g., microphone array) during the meeting (in the event that the object may be moved and/or rotated).

Figure 17:
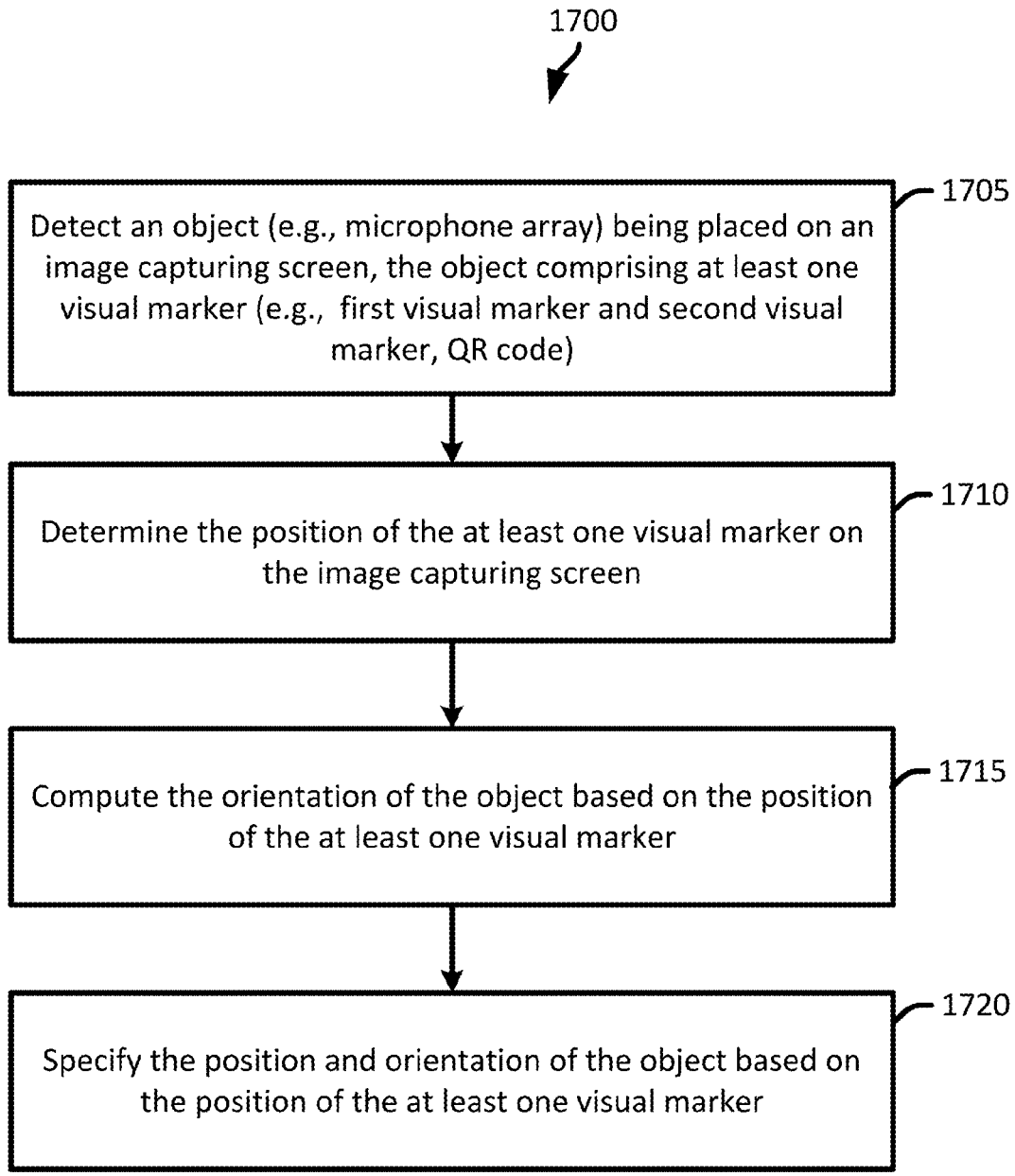
FIG. 17 illustrates another flow diagram of a method for determining the position and orientation of a microphone array.

FIG. 17 illustrates another flow diagram of a method for determining the position and orientation of a microphone array. The method of FIG. 17 may be performed by a microphone array, a device (e.g., device that includes touch sensitive image capture screen), and/or a system that includes a microphone array. In some implementations, the method 1700 of FIG. 17 is performed during step 605 of FIG. 6. As shown in FIG. 17, the method begins by detecting (at 1705) an object (e.g., microphone array) being placed on an image capturing screen. The object has at least one visual marker (e.g., first visual marker, second visual marker, QR code). In some implementations, the visual marker is an inductor. In some implementations, the visual marker is the shape of the microphone array or the shape of the base portion of the microphone array that touches the screen or that is on the screen. The visual marker may have a shape, size, color and reflective property.

Next, the method determines (at 1710) the position of at least one visual marker on or near the screen. In some implementations, this determination may include determining where the visual marker(s) is located on or near the screen (e.g., where the first and second visual markers are located on the image capture screen). FIG. 15 and its corresponding description provide examples of how to determine the position of one or more visual markers.

The method then computes (at 1715) the orientation of the object based on the positions of at least one visual marker. Different implementations may use different methods for computing the orientation of an object. As described above, FIG. 15 illustrates exemplary ways that the orientations and/or direction of an object may be computed. For example, the orientation of the object may correspond to the direction of an imaginary straight line from a first visual marker to a second visual marker.

Once the position of the visual marker is determined, the method may specify (at 1720) the position and orientation of the object based on the position of the visual marker (e.g., first visual marker, second visual marker, QR code). In some implementations, once the position and orientation of the object (e.g., microphone array) is specified, the position and orientation of the object may be used to identify a speaker during a conference. In some implementations, multiple iterations of the method of FIG. 17 are performed during a meeting. That is, in some implementations, the method may continuously determine the position and/or orientation of the object (e.g., microphone array) during the meeting (in the event that the object may be moved and/or rotated).

It should be noted that some or all of the operations described above may be performed locally and/or remotely. In other words, in some implementations, some or all of the operations may be performed by the microphone array, a local device (e.g., local device in the table that integrates the touch sensitive image capture screen), and/or one or more remote devices connected to the microphone array and/or local device.

Having described systems and methods for determining the position and orientation of a microphone array, and for capturing sound and identifying a speaker, a system and method for a collaborative document system will now be described below.

In addition to recording sound and audio (e.g., voice) and being able to identify the identity of the speaker, some implementations may also transcribe the audio and provide collaborative documentation. When audio is transcribed, a written version (e.g., text) of the audio is provided to the participants of the meeting. In some implementations, the text/document may be provided in real-time on the screen of the device (that is integrated in the surface table) and/or the screen of the portable device (e.g., tablets). The text/document may be provided once on the screen of the table for everyone to see or it may be provided locally to each user in the meeting (e.g., provided on a portion of the screen that is near each user).

Figure 18:
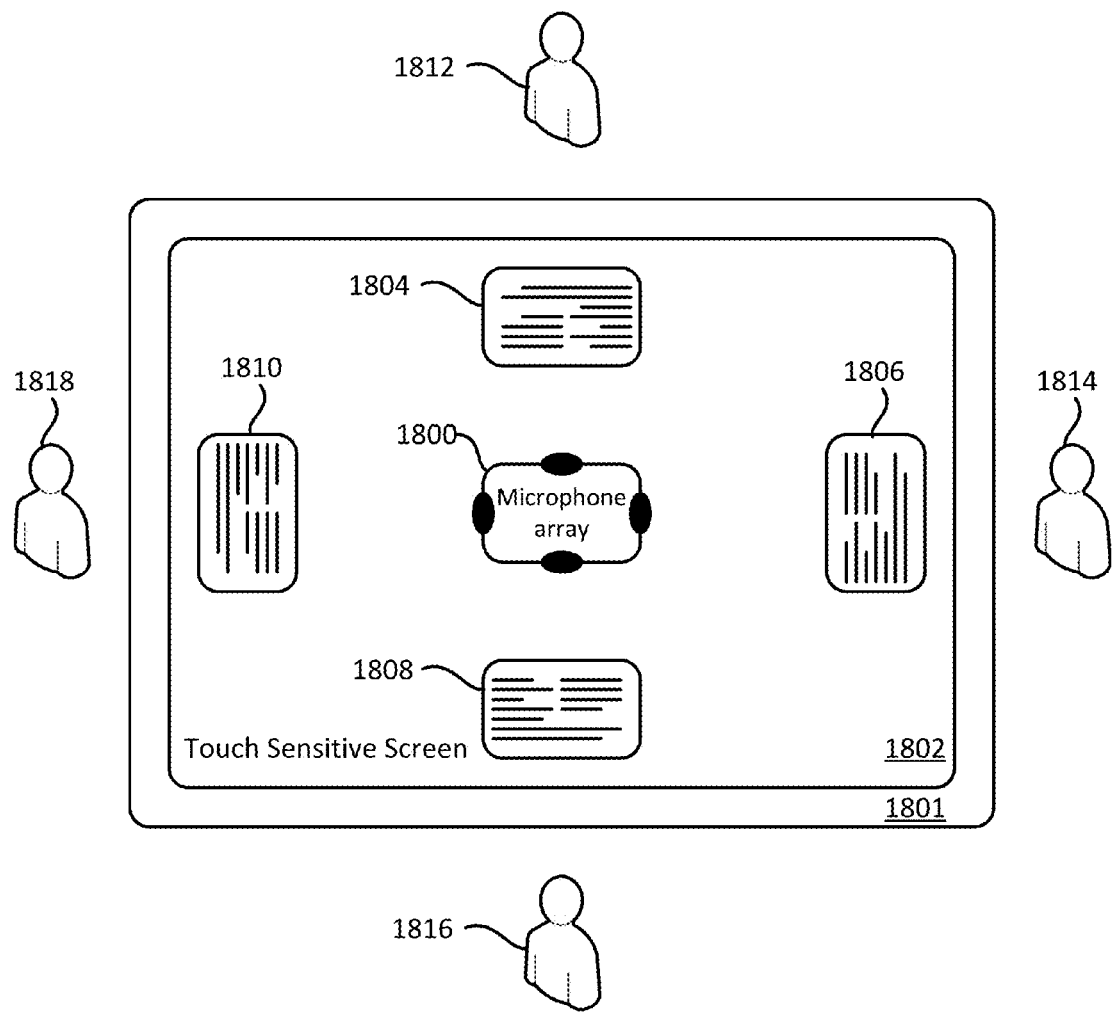
FIG. 18 illustrates transcribed texts being provided to several users.

FIG. 18 illustrates an example of a text/document of a transcribed audio that is provided locally to each user in the meeting. As shown in FIG. 18, the microphone array 1800 is in communication with the device 1801. The device 1801 has a touch sensitive screen 1802. The device 1801 may be integrated on a surface table. During a meeting, as people are talking, the system captures the voice via the microphone array 1800 and determines the identity of the speaker (as described above). The system (e.g., microphone array 1800, device 1801) then transcribes in real time the voice(s) that it captured and presents in real-time what is being said and by whom to each user/person. Thus, as shown in FIG. 18, a local display is provided on the touch sensitive screen 1802. Each local display 1804-1810 is for a particular user. In the example provided, the local display 1804 is for user 1812, the local display 1806 is for user 1814, and the local display 1808 is for user 1816. As shown in FIG. 18, each local display 1804-1810 is a particular portion of the touch sensitive screen 1802. In some implementations, some or all local displays may be a display on a screen of a tablet and/or phone associated with a user.

FIG. 19 illustrates a close-up view of a local display that is provided to a user. As shown in FIG. 19, the local display 1900 provides a text and/or document of what is being said and by whom in the meeting. More specifically, the local display 1900 may include a graphical user interface that includes a text and/or document of what is being said and by whom in the meeting. That is, a name of the person and what that person said is provided. In this example, the document is tagged with an identification tag that identifies the name of the person who spoke (e.g., John). Multiple identification tags may be use, with each tag being used for a particular user.

In some implementations, a user may perform different actions on the text and/or the document that is provided. For example, the user may modify, edit, highlight, annotate and/or comment on the text that is displayed and/or document that is provided. FIG. 20 illustrates an example of an action that a user may perform on text that is displayed in a display area 2000. As shown in FIG. 20, a cursor is moved on top of a portion of a text to highlight the text. In this case, the date "Oct. 15, 2012" has been highlighted. In some implementations, action (e.g., highlight) performed is only shown in the local display of the user that performed the action. In other implementations, action performed by the user is also performed and shown on the local display of other users as well. In some implementations, multiple users may edit the text, with each edit being color coded to indicate who performed the edit. In some implementations, the highlight is an indicator identifying a first portion of a modified shared document that has been modified by a first user from the set of users.

Figure 21:
FIG. 21 illustrates a close-up of a transcribed text that includes another portion of the text being highlighted.

FIG. 21 illustrates another example of an action that a user may perform on a text that is displayed. Specifically, FIG. 21 illustrates a display area 2100 of a different user than the one shown in FIG. 20. As shown in FIG. 21, "Oct. 15, 2012" is also highlighted in the display area 2100 because another user has previously highlighted this text. In addition, another portion of the text has been highlighted. FIG. 21 illustrates this highlight in a different color/shading to indicate that a different user has/is performing this action. In some implementations, the highlights are first and second indicators identifying first and second portions of a modified shared document that has been modified by first and second users from the set of users.

FIGS. 20-21 illustrate a cursor being used to highlight the text. However, in some implementations, the text may be highlighted by a user touching the text on the touch sensitive screen. Thus, the touch sensitive screen may provide a single user input device that multiple users can use to perform document collaboration and editing.

In addition to highlighting text, users may perform other operations as well by interacting with the touch sensitive screen and/or performing operations through other input means (e.g., mouse, keyboard). Examples of other operations user may perform with a touch sensitive screen include (i) assigning action items (e.g., after a meeting) by flicking action items to specific users, (ii) sending text snippets to a person's clipboard (e.g., by flicking towards them text snippets), (iii) requesting for external proofreading (e.g., by flicking towards a user) and merging the proofread version to the main document (e.g., after document has been flicked back to use), (iv) doing word count or grammar check by flicking part of the text to an area of the user interface on the touch sensitive screen does word count, grammar check etc., (v) doing a search (e.g., online search) on a reference by flicking part of the text to an area of the graphical user interface on the touch sensitive screen where search is performed with results being returned on a reference screen, (vi) generating a synopsis by flicking part of the text to an area of the graphical user interface on the touch sensitive screen, and (vii) rotating one paragraph so people sitting at a different side of the table can read it, while the other parts of the text still get worked on by a user (e.g., the main editor).

Figure 22:
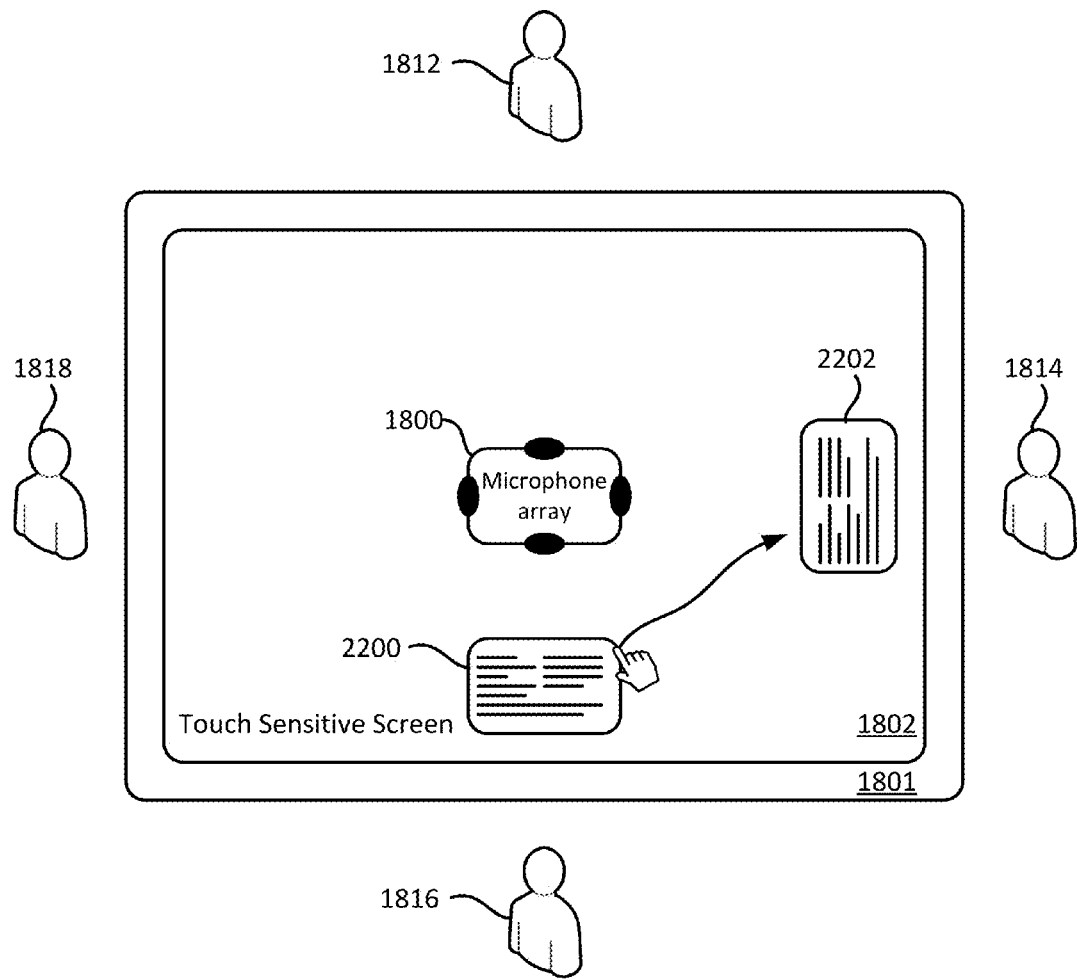
FIG. 22 illustrates an exemplary operation being performed on a transcribed text.

FIG. 22 illustrates an example of one of the operations that a user may perform in some implementations. Specifically, FIG. 22 illustrates a user 1816 assigning work for user 1814 by using the touch sensitive screen 1802. As shown in FIG. 22, the user 1816 has flicked the text/document 2200 to the user 1814. The user 1814 receives this text/document as document 2202.

Figure 23:
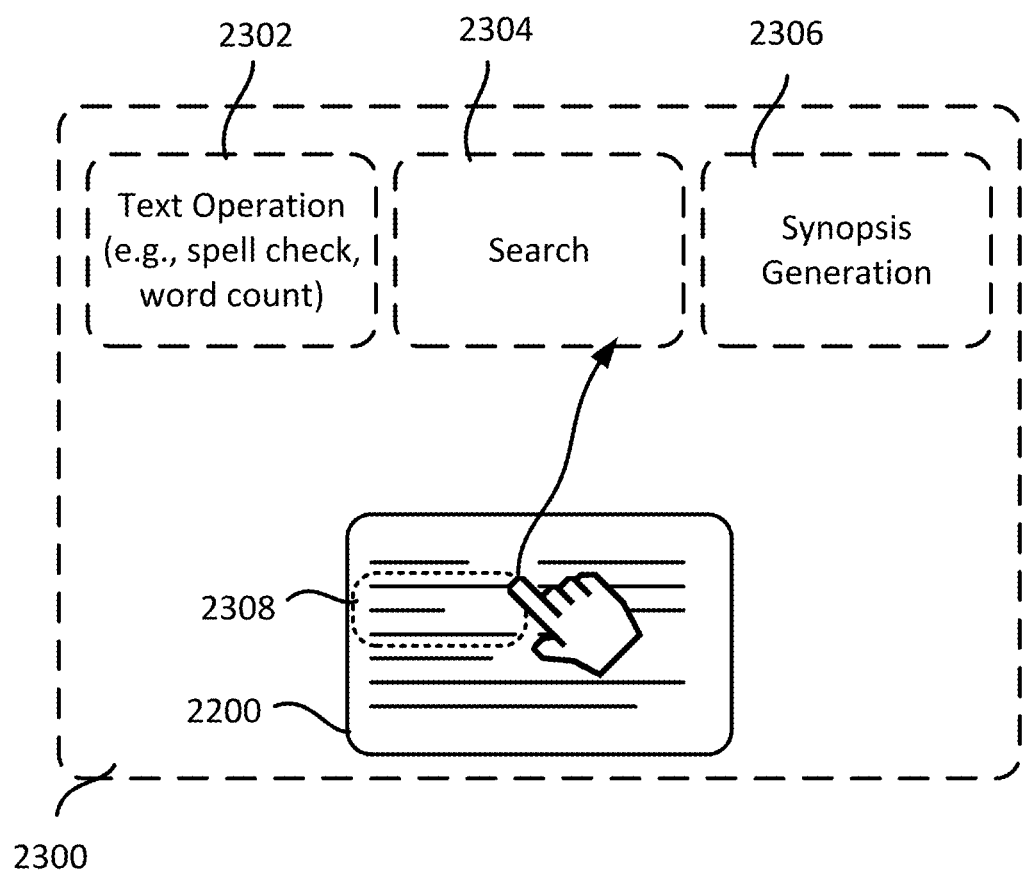
FIG. 23 illustrates another exemplary operation being performed on a transcribed text.

FIG. 23 illustrates another example of one of the operations that a user may perform in some implementations. Specifically, FIG. 23 illustrates a close up view of a portion of a touch sensitive screen (e.g., touch sensitive screen 1802) that may allow a user to perform one or more different operations. As shown in FIG. 23, a touch sensitive screen portion 2300 includes a display of the text/document 2200, a first portion 2302, a second portion 2304 and a third portion 2306. Each of these first, second, and third portions 2302-2306 represent action items/operations that may be performed when a document/text is sent to that particular area. The first portion 2302 corresponds to text operations (e.g., spell check, word count) that may be performed on the document. The second portion 2304 corresponds to a search operation that may be performed on the document/text. For example, a document and/or text that is sent to that area may result in a search (e.g., online search) being performed based on the document and/or text. The result of such a search may be displayed back to the user in another area of the touch sensitive screen in some implementations. As shown in FIG. 23, a user has sent a portion 2308 of a text/document to the second portion 2304, which will results in a search being performed based on the content of the portion 2308. The result of which may be displayed back to the user in an area of the touch sensitive screen or a separate screen (e.g., separate monitor, TV) in some implementations. The third portion 2306 corresponds to a synopsis operation being performed on a text/document that is sent. Different implementations may have different portions for performing different operations.

At the end of the meeting, the transcription ends and all notes and minutes that were documented can be saved and/or emailed to the participants of the meeting or anyone else. Thus, the above method provides a novel way for users to collaborate on a document. Specifically, the above method allows user to collaborate on a document by providing an easy way to identify the identity of the users.

Figure 24:
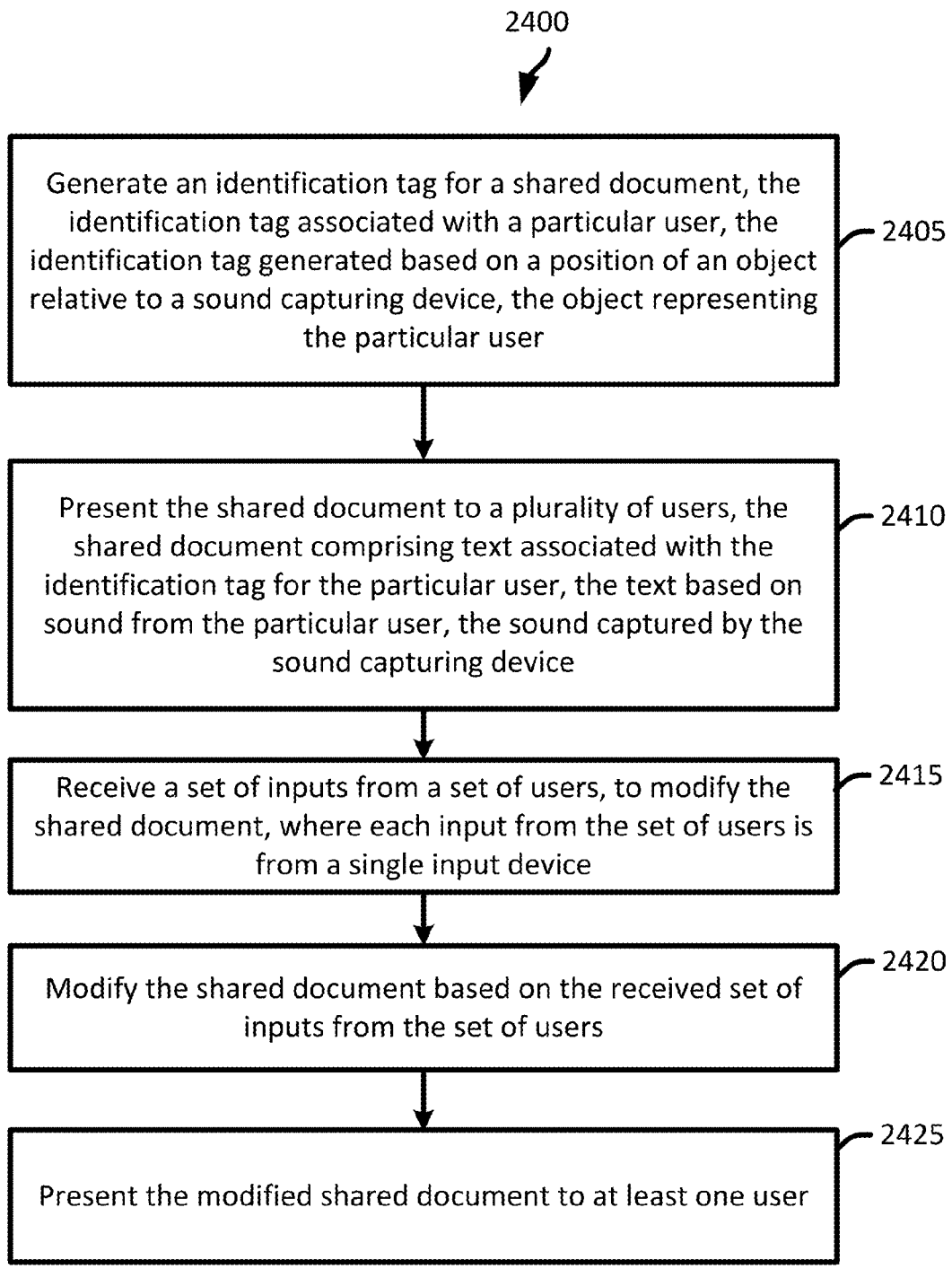
FIG. 24 illustrates a flow diagram of a method for collaborating on a shared document.

FIG. 24 illustrates a flow diagram of a method for collaborating on a shared document in some implementations. The shared document may be a document that is generated during a meeting. For example, the shared document may include transcribed text of voices captured by a microphone array during a meeting.

As shown in FIG. 24, the method generates (at 2405) an identification tag for the shared document. The identification tag is associated with a particular user in some implementations. The identification tag is generated based on a position of an object relative to a sound capturing device (e.g., microphone array 100). The sound capturing device may be a microphone array in some implementations. The object may represent the particular user.

Next, the method presents (at 2410) the shared document to several users. The shared document includes text associated with the identification tag for the particular user. The text is based on sound from the particular user. The sound is captured by the sound capturing device (e.g., microphone array) in some implementations. FIG. 19 illustrates an example of a shared document that may be presented to several users.

The method then receives (at 2415) a set of inputs from a set of users, to modify the shared document. In some implementations, each input from the set of users is from a single input device (e.g., the input is from a touch sensitive screen). In some implementations, the set of inputs includes a set of gestures (e.g., flicking) on the touch sensitive screen. FIGS. 20-21 illustrate examples of inputs that may be received from a set of users. Next, the method modifies (at 2420) the shared document based on the received set of inputs from the set of users. Examples of modifications of the shared document include text editing and/or text highlighting.

After modifying (at 2420) the shared document, the method presents (at 2425) the modified shared document to at least one user and ends. FIGS. 20-21 also illustrate the presentation of the modified shared document in some implementations.

It should be noted that some or all of the operations described above may be performed locally and/or remotely. In other words, in some implementations, some or all of the operations may be performed by the microphone array, a local device (e.g., local device in the table that integrates the touch sensitive screen), and/or one or more remote devices connected to the microphone array and/or local device. For example, the transcription, search, synopsis may be performed remotely in some implementations.

Figure 25:
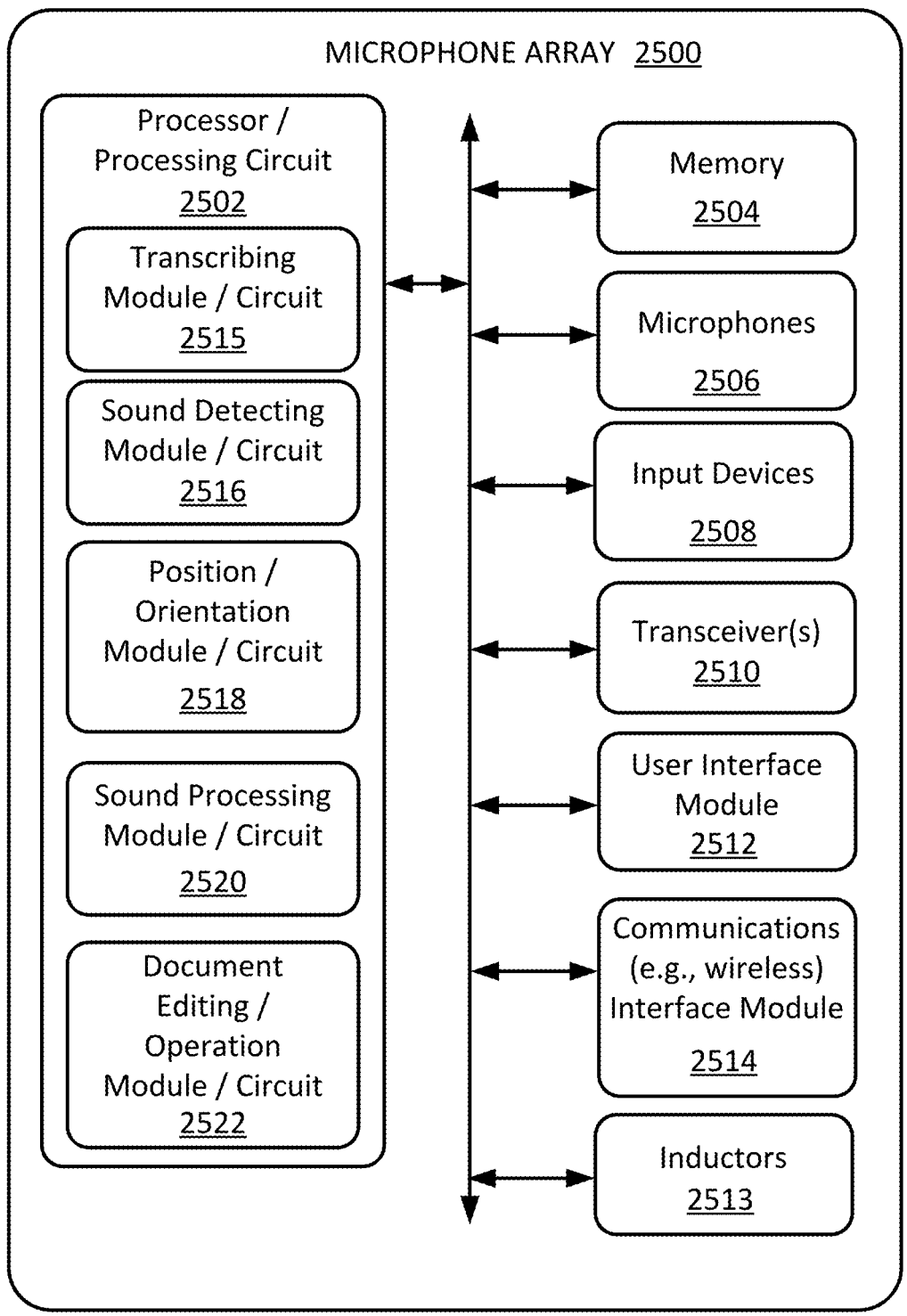
FIG. 25 illustrates an exemplary microphone array used in a system for capturing and identifying sound.

FIG. 25 illustrates an example of a microphone array (e.g., sound capturing device) that some implementations may use. As shown in FIG. 25, the microphone array 2500 may include at least one processor/processing circuit 2502, a memory 2504, several microphones 2506, several input devices 2508, at least one transceiver 2510, at least one user interface module 2512, at least one inductor 2513, and at least one communications interface module 2514.

The microphones 2506 may be used to capture sound and/or voice. The input devices 2508 allow a user to input data and/or provide control of the microphone array. The transceiver 2510 allows the microphone array to transmit and receive wireless signals from other devices (e.g., phone, computer, tablet, microphone array). The microphone array 2500 may include multiple transceivers, which allows the microphone array 2500 to communicate (e.g., wirelessly) with different devices using different communications links and different communication protocols. In some implementations, the user interface module 2512 provides an interface between the microphones 2506, input devices 2508 and the processor/processing circuit 2502. The user interface module 2512 may include several user interface modules (e.g., a module for each component). In some implementations, the communications interface module 2514 provides an interface between the transceiver 2510 and the processor/processing circuit 2502. The communications interface module 2514 may include several interface modules (e.g., a module for each transceiver). The microphone array 2500 may include other components as well, such as infrared transmitters/sensors, sonic transmitters/sensors, and ultrasonic transmitters/sensors, which may be used to determine and/or track the position/location of nearby objects (e.g., devices, mobile devices).

As shown in FIG. 25, the processor/processing circuit 2502 may include a transcribing module/circuit 2515, a sound detecting module/circuit 2516, position/orientation module/circuit 2518, a sound processing module/circuit 2520, and a document editing/operation module/circuit 2522.

The transcribing module/circuit 2515 is for transcribing captured sound in some implementations. The sound detecting module/circuit 2516 is for detecting and capturing sound. In some implementations, the sound detecting module/circuit 2516 captures sound from the microphones 2506. The position/orientation module/circuit 2518 is for determining the position and/or orientation of the microphone array 2500 in some implementations. The sound processing module/circuit 2520 is for processing sound captured by the microphones 2506 in some implementations. The processing of sound may include extracting individual sound from the captured sound. The processing of sound may also include identifying the identity of speakers in some implementations. The document editing/operation module/circuit 2522 is for performing various operations on documents. These documents may include transcribed text from the captured sound in some implementations. The document editing/operation module/circuit 2522 may include a transcription module/circuit for transcribing the capture sound/voice.

Figure 26:
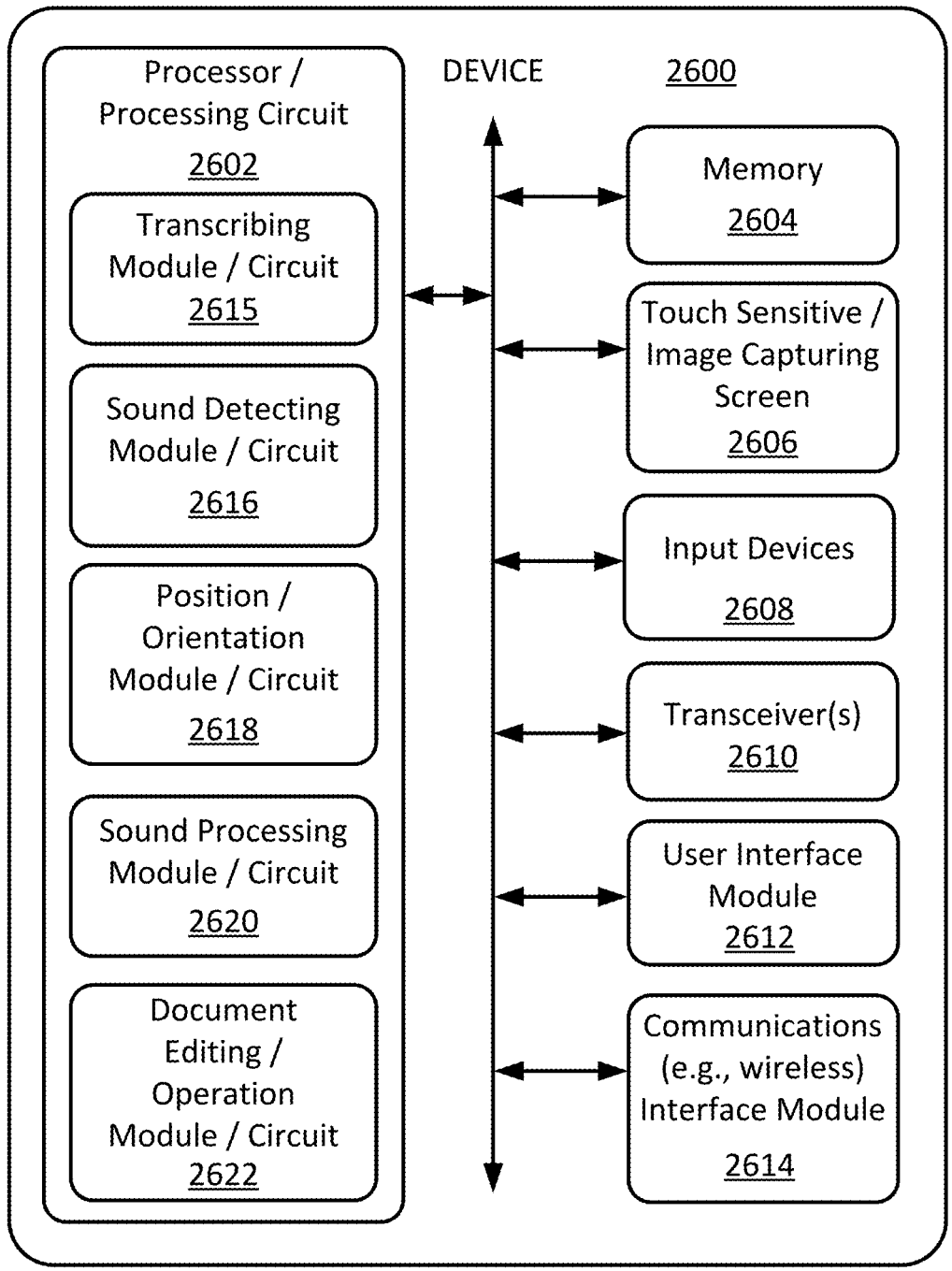
FIG. 26 illustrates an exemplary device used in a system for capturing and identifying sound.

FIG. 26 illustrates an example of a device (e.g., device 101 integrated on a surface table) that some implementations may use. The device may be a mobile device (e.g., handset, tablet) in some implementations. As shown in FIG. 26, the device 2600 may include at least one processor/processing circuit 2602, a memory 2604, a touch sensitive/image capturing screen 2606, several input devices 2608, at least one transceiver 2610, at least one user interface module 2612, and at least one communications interface module 2614.

The touch sensitive/image capturing screen 2606 may be used to display a graphical user interface. The touch sensitive/image capturing screen 2606 may also be used to receive input from one or more users. The touch sensitive/image capturing screen 2606 may include functionality/capability to detect and/or capture one or more objects on or near the screen. The input devices 2608 allow a user to input data and/or provide control of the device. The transceiver 2610 allows the device to transmit and receive wireless signals from other devices (e.g., phone, computer, tablet, microphone array). The device may include multiple transceivers, which allows the device to communicate (e.g., wirelessly) with different devices using different communications links and different communication protocols. The device 2600 may include other components as well, such as infrared transmitters/sensors, sonic transmitters/sensors, and ultrasonic transmitters/sensors, which may be used to determine and/or track the position/location of nearby objects (e.g., microphone array, devices, mobile devices).

In some implementations, the user interface module 2612 provides an interface between the touch sensitive screen 2606, input devices 2608 and the processor/processing circuit 2602. The user interface module 2612 may include several user interface modules (e.g., a module for each component). In some implementations, the communications interface module 2614 provides an interface between the transceiver 2610 and the processor/processing circuit 2602. The communications interface module 2614 may include several interface modules (e.g., a module for each transceiver).

As shown in FIG. 26, the processor/processing circuit 2602 may include a transcribing module/circuit 2615, a sound detecting module/circuit 2616, position/orientation module/circuit 2618, a sound processing module/circuit 2620, and a document editing/operation module/circuit 2622.

The transcribing module/circuit 2615 is for transcribing captured sound in some implementations. The sound detecting module/circuit 2616 is for detecting and capturing sound. In some implementations, the sound detecting module/circuit 2616 captures sound from a microphone (input device). The position/orientation module/circuit 2618 is for determining the position and/or orientation of the microphone array 2600 in some implementations. The sound processing module/circuit 2620 is for processing sound captured by microphones in some implementations. The microphones may be microphones from a microphone array coupled to the device. The processing of sound may include extracting individual sound from the captured sound. The processing of sound may also include identifying the identity of speakers in some implementations. The document editing/operation module/circuit 2622 is for performing various operations on documents. These documents may include transcribed text from the captured sound in some implementations. The document editing/operation module/circuit 2622 may include a transcription module/circuit for transcribing the capture sound/voice.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other.

One or more of the components, steps, features, and/or functions illustrated in FIGS. 1, 2, 3, 4, 5, 6, 7, 8, 9, 10, 11A-11C, 12A-12B, 13, 14, 15, 16, 17, 18, 19, 20, 21, 22, 23, 24, 25 and/or 26 may be rearranged and/or combined into a single component, step, feature or function or embodied in several components, steps, or functions. Additional elements, components, steps, and/or functions may also be added without departing from the invention.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" or "machine readable storage medium" include, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits (e.g., processing circuit), elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus for identifying a speaker, the apparatus comprising:
    a first device, comprising a touch sensitive screen, for capturing a position and an orientation of a second device, the second device comprising a plurality of microphones for capturing sound, wherein the second device has a movable position and a movable orientation on the touch sensitive screen, the touch sensitive screen capturing the position and the orientation of the second device on the touch sensitive screen; and
    at least one processor configured to:
    determine the position and orientation of the second device based on data from the first device;
    assign an object as a representation of a first user from among a plurality of users each being represented by a corresponding object, wherein the object comprises a graphical user interface element in a graphical user interface presented on the touch sensitive screen, and wherein the graphical user interface element is displayed within the graphical user interface in a location independent from a position of the first user and is movable within the graphical user interface via user interaction with the touch sensitive screen displaying the graphical user interface;
    receive a position of the object from the touch sensitive screen, wherein the position of the object and the position of the second device on the touch sensitive screen determine a direction of the object with respect to the second device;
    process the captured sound to identify sound originating from the direction of the object; and
    associate the identified sound originating from the direction of the object as belonging to the first user being represented on the graphical user interface by the object.

2. The apparatus of claim 1, wherein the second device comprises a first inductive component and a second inductive component, the touch sensitive screen capturing the position and the orientation of the second device by capturing where the first and second inductive components are coupled to the touch sensitive screen.

3. The apparatus of claim 2, wherein the first inductive component has a different size than the second inductive component.

4. The apparatus of claim 1, wherein the touch sensitive screen is included within a surface table.

5. The apparatus of claim 1, wherein the first device comprises a mobile device.

6. The apparatus of claim 5, wherein the mobile device comprises one or more of a handset, a tablet, a phone, a smart phone, a portable electronic device, an electronic notepad, and/or a personal digital assistant (PDA).

7. The apparatus of claim 1, wherein the first device comprises an image capturing screen.

8. The apparatus of claim 7, wherein the second device comprises at least one visual marker, the image capturing screen for capturing the position and the orientation of the second device by capturing the position and orientation of the at least one visual marker of the second device.

9. The apparatus of claim 1, wherein the position of the object is moved via the user interaction with the touch sensitive screen in order to represent a movement in the position of the first user.

10. The apparatus of claim 1, wherein the first user is proximate to the touch sensitive screen.

11. A method for identifying a speaker, the method comprising:
    determining a position and orientation of a second device based on data from a first device comprising a touch sensitive screen, the first device for capturing the position and orientation of the second device, the second device comprising a plurality of microphones for capturing sound, wherein the second device has a movable position and a movable orientation on the touch sensitive screen, the touch sensitive screen capturing the position and the orientation of the second device on the touch sensitive screen;
    assigning an object as a representation of a first user, wherein the object comprises a graphical user interface element in a graphical user interface presented on the touch sensitive screen, and wherein the graphical user interface element is displayed within the graphical user interface in a location independent from a position of the first user and is movable within the graphical user interface via user interaction with the touch sensitive screen displaying the graphical user interface;
    receiving a position of the object from the touch sensitive screen, wherein the position of the object and the position of the second device on the touch sensitive screen determine a direction of the object with respect to the second device;
    processing the captured sound to identify sound originating from the direction of the object; and
    associate the identified sound originating from the direction of the object as belonging to the first user being represented on the graphical user interface by the object.

12. The method of claim 11, wherein the second device comprises a first inductive component and a second inductive component, the touch sensitive screen capturing the position and the orientation of the second device by capturing where the first and second inductive components are coupled to the touch sensitive screen.

13. The method of claim 11, wherein the first inductive component has a different size than the second inductive component.

14. The method of claim 11, wherein the touch sensitive screen is included within a surface table.

15. The method of claim 11, wherein the first device comprises a mobile device.

16. The method of claim 15, wherein the mobile device comprises one or more of a handset, a tablet, a phone, a smart phone, a portable electronic device, an electronic notepad, and a personal digital assistant (PDA).

17. The method of claim 11, wherein the first device comprises an image capturing screen.

18. The method of claim 17, wherein the second device comprises at least one visual marker, the image capturing screen for capturing the position and the orientation of the second device by capturing the position and orientation of the at least one visual marker of the second device.

19. The method of claim 11, wherein the position of the object is moved via the user interaction with the touch sensitive screen in order to represent a movement in the position of the first user.

20. The method of claim 11, wherein the first user is proximate to the touch sensitive screen.

21. An apparatus for identifying a speaker, the apparatus comprising:
  means for determining a position and orientation of a second device based on data from a first device comprising a touch sensitive screen, the first device for capturing the position and orientation of the second device, the second device comprising a plurality of microphones for capturing sound, wherein the second device has a movable position and a movable orientation on the touch sensitive screen, the touch sensitive screen capturing the position and the orientation of the second device on the touch sensitive screen;
  means for assigning an object as a representation of a first user from among a plurality of users each being represented by a corresponding object, wherein the object comprises a graphical user interface element in a graphical user interface presented on the touch sensitive screen, and wherein the graphical user interface element is displayed within the graphical user interface in a location independent from a position of the first user and is movable within the graphical user interface via user interaction with the touch sensitive screen displaying the graphical user interface;
  means for receiving a position of the object from the touch sensitive screen, wherein the position of the object and the position of the second device on the touch sensitive screen determine a direction of the object with respect to the second device;
  means for processing the captured sound to identify sound originating from the direction of the object; and
  means for associating the identified sound originating from the direction of the object as belonging to the first user being represented on the graphical user interface by the object.

22. The apparatus of claim 21, wherein the second device comprises a first inductive component and a second inductive component, the touch sensitive screen capturing the position and the orientation of the second device by capturing where the first and second inductive components are coupled to the touch sensitive screen.

23. The apparatus of claim 22, wherein the first inductive component has a different size than the second inductive component.

24. The apparatus of claim 21, wherein the touch sensitive screen is included within a surface table.

25. The apparatus of claim 21, wherein the first device comprises a mobile device.

26. The apparatus of claim 25, wherein the mobile device comprises one or more of a handset, a tablet, a phone, a smart phone, a portable electronic device, an electronic notepad, and a personal digital assistant (PDA).

27. The apparatus of claim 21, wherein the first device comprises an image capturing screen.

28. The apparatus of claim 27, wherein the second device comprises at least one visual marker, the image capturing screen for capturing the position and the orientation of the second device by capturing the position and orientation of the at least one visual marker of the second device.

29. The apparatus of claim 21, wherein the position of the object is moved via the user interaction with the touch sensitive screen in order to represent a movement in the position of the first user.

30. The apparatus of claim 21, wherein the apparatus comprises a handset.

31. The apparatus of claim 21, wherein the first user is proximate to the touch sensitive screen.

32. A non-transitory computer readable storage medium comprising one or more instructions for identifying a speaker, which when executed by at least one processor, causes the at least one processor to:
  determine a position and orientation of a second device based on data from a first device comprising a touch sensitive screen, the first device for capturing the position and orientation of the second device, the second device comprising a plurality of microphones for capturing sound, wherein the second device has a movable position and a movable orientation on the touch sensitive screen, the touch sensitive screen capturing the position and the orientation of the second device on the touch sensitive screen;
  assign an object as a representation of a first user from among a plurality of users each being represented by a corresponding object, wherein the object comprises a graphical user interface element in a graphical user interface presented on the touch sensitive screen, and wherein the graphical user interface element is displayed within the graphical user interface in a location independent from a position of the first user and is movable within the graphical user interface via user interaction with the touch sensitive screen displaying the graphical user interface;
  receive a position of the object from the touch sensitive screen, wherein the position of the object and the position of the second device on the touch sensitive screen determine a direction of the object with respect to the second device;
  process the captured sound to identify sound originating from the direction of the object; and
  associate the identified sound originating from the direction of the object as belonging to the first user being represented on the graphical user interface by the object.

33. The non-transitory computer readable storage medium of claim 32, wherein the second device comprises a first inductive component and a second inductive component, the touch sensitive screen capturing the position and the orientation of the second device by capturing where the first and second inductive components are coupled to the touch sensitive screen.

34. The non-transitory computer readable storage medium of claim 33, wherein the first inductive component has a different size than the second inductive component.

35. The non-transitory computer readable storage medium of claim 32, wherein the touch sensitive screen is included within a surface table.

36. The non-transitory computer readable storage medium of claim 32, wherein the first device comprises a mobile device.

37. The non-transitory computer readable storage medium of claim 36, wherein the mobile device comprises a handset, a tablet, a phone, a smart phone, a portable electronic device, an electronic notepad, and/or a personal digital assistant (PDA).

38. The non-transitory computer readable storage medium of claim 32, wherein the first device comprises an image capturing screen.

39. The non-transitory computer readable storage medium of claim 32, wherein the second device comprises at least one visual marker, the image capturing screen for capturing the position and the orientation of the second device by capturing the position and orientation of the at least one visual marker of the second device.

40. The non-transitory computer-readable storage medium of claim 32, wherein the first user is proximate to the touch sensitive screen.

* * * * *